(12) United States Patent
Ostap et al.

(10) Patent No.: US 11,350,029 B1
(45) Date of Patent: May 31, 2022

(54) APPARATUS AND METHOD OF DETECTING AND DISPLAYING VIDEO CONFERENCING GROUPS

(71) Applicant: Logitech Europe S.A., Lausanne (CH)

(72) Inventors: Oleg Ostap, Camas, WA (US); Kostiantyn Verhun, Ternopil (UA); Ihor Dutchak, Skalalat (UA); Henry Levak, San Mateo, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

(21) Appl. No.: 17/216,494

(22) Filed: Mar. 29, 2021

(51) Int. Cl.
| | |
|---|---|
| H04N 7/15 | (2006.01) |
| H04N 5/232 | (2006.01) |
| H04N 5/247 | (2006.01) |
| H04N 7/14 | (2006.01) |
| G06T 7/50 | (2017.01) |
| G06T 7/70 | (2017.01) |
| H04N 5/265 | (2006.01) |

(52) U.S. Cl.
CPC ......... *H04N 5/23222* (2013.01); *G06T 7/50* (2017.01); *G06T 7/70* (2017.01); *H04N 5/23219* (2013.01); *H04N 5/23296* (2013.01); *H04N 5/23299* (2018.08); *H04N 5/247* (2013.01); *H04N 5/265* (2013.01); *H04N 7/142* (2013.01); *H04N 7/15* (2013.01); *G06T 2207/10016* (2013.01); *G06T 2207/20212* (2013.01); *G06T 2207/30196* (2013.01)

(58) Field of Classification Search
CPC .......... H04N 5/232; H04N 5/247; H04N 7/14; H04N 7/15; H04N 7/147; H04N 5/265; G06T 7/50; G06T 7/70

USPC ........................................... 348/14.01–14.16
See application file for complete search history.

(56) References Cited

U.S. PATENT DOCUMENTS

| | | |
|---|---|---|
| 5,434,617 A | 7/1995 | Bianchi |
| 6,392,694 B1 | 5/2002 | Bianchi |
| 6,611,281 B2 | 8/2003 | Strubbe |
| 6,731,334 B1 | 5/2004 | Maeng et al. |
| 6,829,391 B2 | 12/2004 | Comaniciu et al. |
| 7,349,008 B2 | 3/2008 | Rui et al. |
| 7,433,327 B2 | 10/2008 | Harville et al. |
| 7,724,972 B2 | 5/2010 | Wang et al. |

(Continued)

*Primary Examiner* — Melur Ramakrishnaiah
(74) *Attorney, Agent, or Firm* — Patterson & Sheridan, LLP

(57) ABSTRACT

Embodiments herein generally relate to video conferencing systems and, more particularly, to multi-camera systems used to detect participants in a conference environment and auto frame a video stream of a priority group from the detected participants. In one embodiment, a computer-implemented method includes determining a plurality of subjects within a first view of a conference environment and altering a second view of the conference environment after determining that at least a portion of one or more of the plurality of subjects cannot fit in the second view when the second view is adjusted to include the other ones of the plurality of subjects. Here, each of the plurality of subjects includes a region-of-interest corresponding to a portion of an individual conference participant. Altering the second view includes determining a priority subject group and adjusting the second view to include the priority subject group. In some embodiments, the priority subject group includes two or more subjects of the plurality of subjects.

21 Claims, 12 Drawing Sheets

(56) References Cited

U.S. PATENT DOCUMENTS

| | | |
|---|---|---|
| 7,746,401 B2 | 6/2010 | Wu et al. |
| 7,940,432 B2 | 5/2011 | Shih et al. |
| 8,094,193 B2 | 1/2012 | Peterson et al. |
| 8,154,583 B2 | 4/2012 | Kurtz et al. |
| 8,169,463 B2 | 5/2012 | Enstad et al. |
| 8,284,254 B2 | 10/2012 | Romanowich et al. |
| 8,358,328 B2 | 1/2013 | Friel et al. |
| 8,368,752 B2 | 2/2013 | Lin et al. |
| 8,471,889 B1 | 6/2013 | Lee et al. |
| 8,547,414 B2 | 10/2013 | Sheeley |
| 8,564,637 B2 | 10/2013 | Wu |
| 8,614,735 B2 | 12/2013 | Buckler |
| 8,659,638 B2 | 2/2014 | Chao et al. |
| 8,780,168 B2 | 7/2014 | Corley et al. |
| 8,818,175 B2 | 8/2014 | Dubin et al. |
| 8,842,161 B2 | 9/2014 | Feng et al. |
| 8,872,882 B2 | 10/2014 | Shanmukhadas et al. |
| 8,885,057 B2 | 11/2014 | Mock |
| 8,913,103 B1 | 12/2014 | Sargin et al. |
| 9,001,183 B2 | 4/2015 | Mauchly |
| 9,077,906 B1 | 7/2015 | Tsai et al. |
| 9,237,307 B1 | 1/2016 | Vendrow |
| 9,270,941 B1 | 2/2016 | Lavelle |
| 9,338,395 B2 | 5/2016 | Wang et al. |
| 9,798,933 B1 | 10/2017 | Meisser et al. |
| 10,360,457 B2 | 7/2019 | Meisser et al. |
| 10,650,244 B2 | 5/2020 | Meisser et al. |
| 10,904,446 B1 * | 1/2021 | Ostap ................. H04N 5/23218 |
| 10,951,858 B1 | 3/2021 | Ostap et al. |
| 10,965,908 B1 | 3/2021 | Ostap et al. |
| 10,972,655 B1 | 4/2021 | Ostap et al. |
| 2002/0106137 A1 | 8/2002 | Chen et al. |
| 2004/0003409 A1 | 1/2004 | Berstis |
| 2009/0174530 A1 | 7/2009 | Yen et al. |
| 2011/0050843 A1 | 3/2011 | Cheng et al. |
| 2011/0099493 A1 | 4/2011 | Yu et al. |
| 2011/0116538 A1 | 5/2011 | Chuang et al. |
| 2011/0128350 A1 | 6/2011 | Oliver et al. |
| 2011/0131498 A1 | 6/2011 | Chao et al. |
| 2011/0141314 A1 | 6/2011 | Liu et al. |
| 2011/0148759 A1 | 6/2011 | Hwang et al. |
| 2011/0148792 A1 | 6/2011 | Hwang et al. |
| 2011/0161836 A1 | 6/2011 | Mu et al. |
| 2012/0019611 A1 | 1/2012 | Wu et al. |
| 2012/0050458 A1 * | 3/2012 | Mauchly ............ H04N 5/23238 348/14.16 |
| 2012/0169883 A1 | 7/2012 | Chang et al. |
| 2012/0223960 A1 | 9/2012 | Chiang et al. |
| 2012/0268626 A1 | 10/2012 | Lu et al. |
| 2012/0327179 A1 * | 12/2012 | Watson .............. H04N 5/23299 348/14.08 |
| 2013/0329003 A1 | 12/2013 | Hsia et al. |
| 2013/0335508 A1 | 12/2013 | Mauchly |
| 2014/0111600 A1 | 4/2014 | Schaefer et al. |
| 2014/0313346 A1 | 10/2014 | Huang et al. |
| 2015/0022636 A1 | 1/2015 | Savransky |
| 2016/0057385 A1 | 2/2016 | Burenius |
| 2016/0173821 A1 | 6/2016 | De Magalhaes |
| 2016/0286166 A1 | 9/2016 | Sandvik et al. |
| 2016/0291861 A1 | 10/2016 | Song et al. |
| 2017/0149854 A1 * | 5/2017 | Dove ........................ G06F 3/14 |
| 2018/0103235 A1 * | 4/2018 | Clavel ................ H04L 12/1831 |
| 2020/0195853 A1 * | 6/2020 | Wang ................. G06K 9/00255 |
| 2021/0266667 A1 | 8/2021 | Zabel et al. |

\* cited by examiner

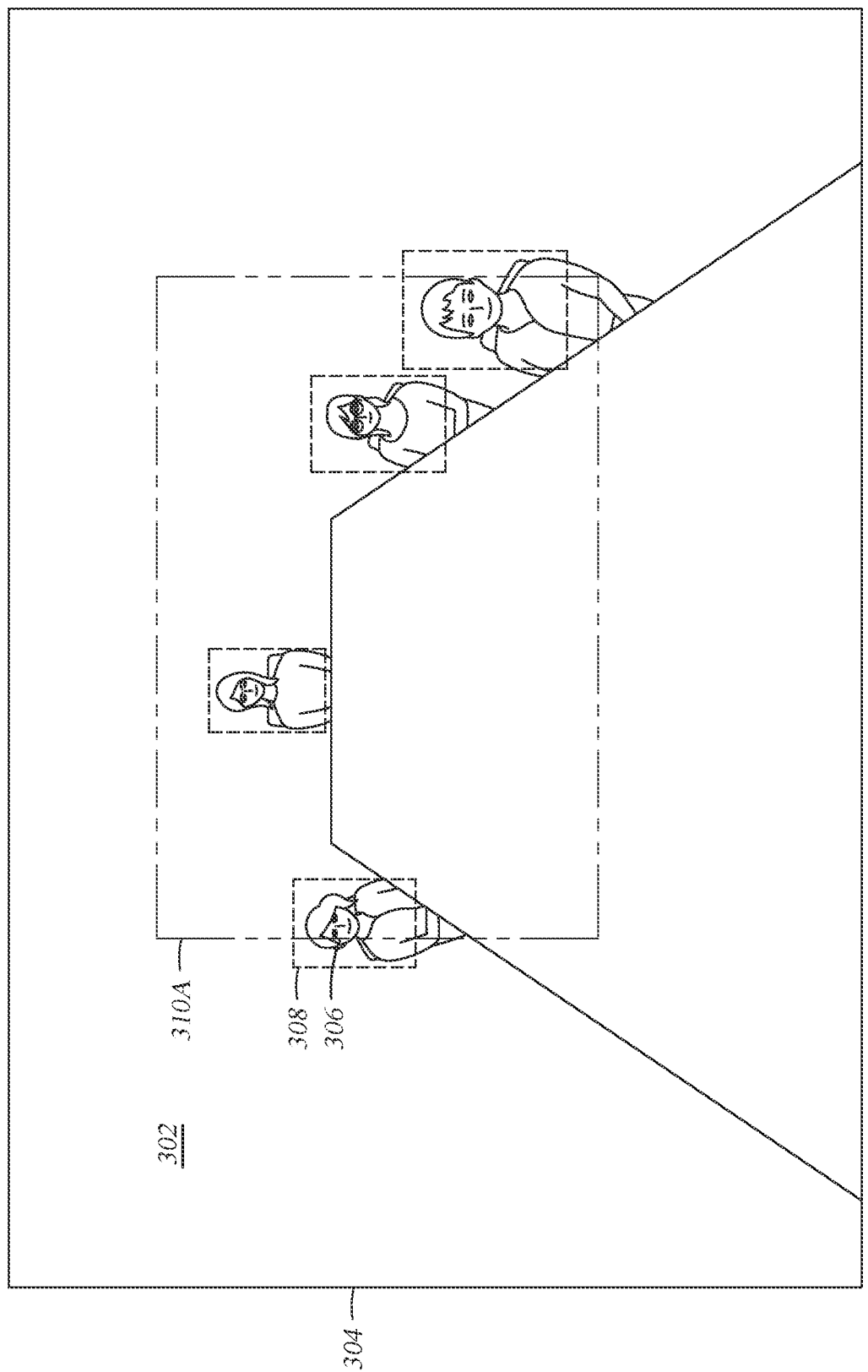

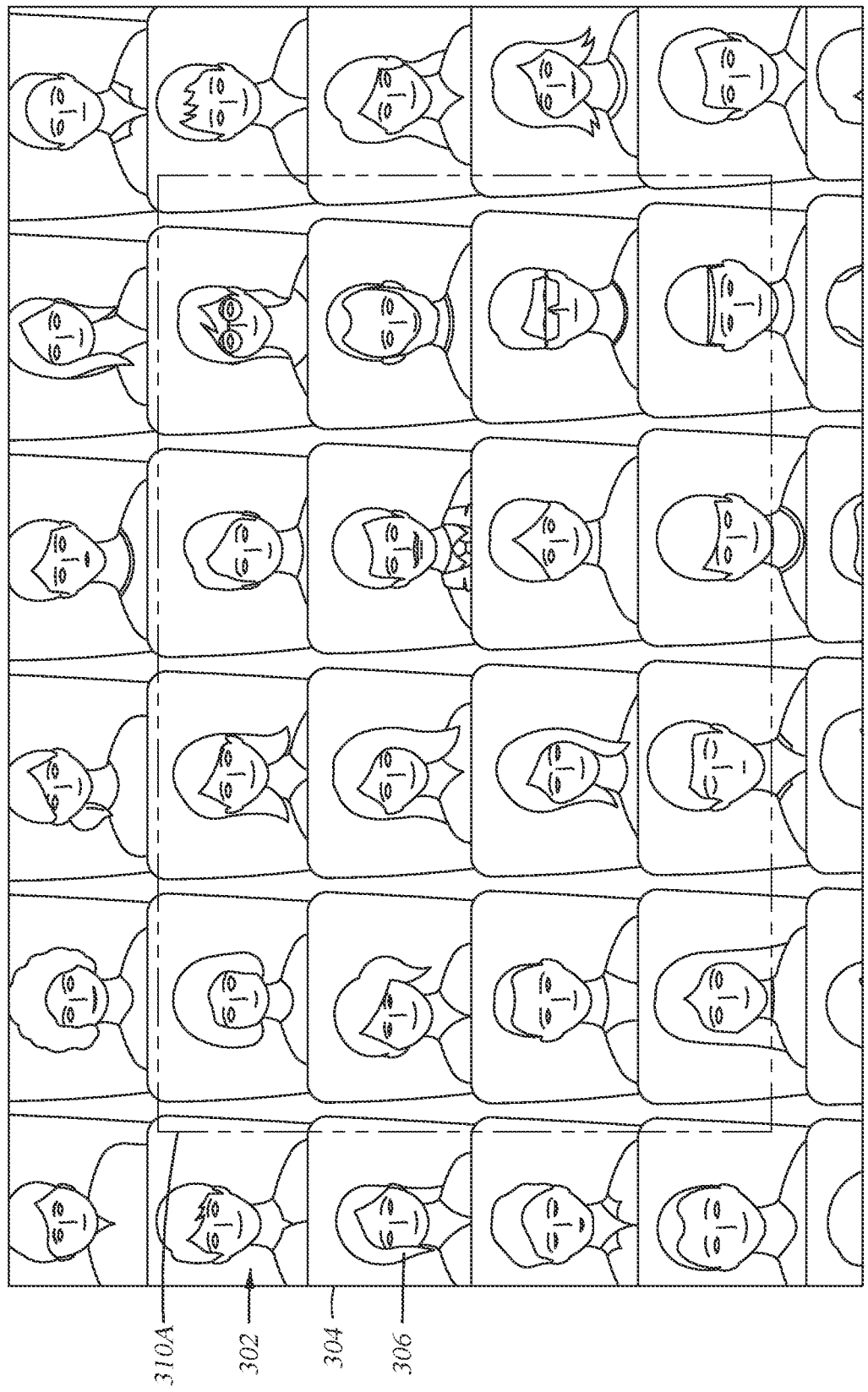

APPARATUS AND METHOD OF DETECTING AND DISPLAYING VIDEO CONFERENCING GROUPS

BACKGROUND

Field

Embodiments of the present disclosure are generally directed to video conferencing systems and related video conferencing methods.

Description of the Related Art

Traditionally, video-conferencing systems suitable for conferencing between one or more groups of participants have been relegated to spaces where rooms and technological resources are dedicated solely to the task of video conferencing. In recent years, video-conferencing has seen a dramatic shift in popularity, thanks largely to the proliferation of high-speed Internet, declining costs of video-conferencing equipment, and a global need for remote collaboration. User expectations have increased along with the popularity of video-conferencing with increased demand for sophisticated video-conferencing systems. Users have come to expect the same sophisticated technology, once found solely in costly and limited designated conferencing spaces, to be available in easily installed systems having the flexibility to be used across conference environments of all different sizes and shapes. Automatic framing of a conference environment provides an example of one such technology.

Video conferencing systems having auto-framing capabilities are generally configured to detect activity in a video conference environment and adjust the boundaries of an image (field-of-view) displayed to a remote conference participant accordingly. For example, some video conferencing systems may be configured to detect an initial number of user participants within a larger physical space and automatically reframe the captured video stream around those participants to improve the viewing experience for remote conference participants. Typically, once a camera's field-of-view has been reframed about the initial conference participants, the camera is no longer useful for monitoring areas outside of the framed space for changes in information. Thus, systems that are even more sophisticated may use a second camera to monitor the unframed spaces in the conference environment for changes in information, such as new participants entering the room outside of the zoomed-in field-of-view of the first camera.

Unfortunately, a difference in view angles between the two cameras means that, at least in some situations, a portion of the room within the field-of-view of the second camera will fall outside of a field-of-view of the first camera. Thus, the field-of-view of the first camera may not be wide enough to capture all participants or activities during a video-conferencing session. In other words, the first camera cannot zoom out far enough to capture a video stream of all conference participants in the room.

Accordingly, there is a need in the art for methods for determining the desired view of a meeting room when a field-of-view is not wide enough to capture all of the participants therein.

SUMMARY

The present disclosure generally provides for advanced video conferencing methods and video conferencing systems for performing the methods. In particular, embodiments herein provide for video communications systems and methods for grouping participants according to participant location within a conference environment, ranking the groups according to priority, selecting one of the participant groups for inclusion in a video stream based on the priority ranking, determining the desired composition of the video stream around the selected group using one or more composition rules, and adjusting the video stream to provide the desired composition.

In one embodiment, a computer-implemented method includes determining a plurality of subjects within a first view of a conference environment and altering a second view of the conference environment after determining that at least a portion of one or more of the plurality of subjects cannot fit in the second view when the second view is adjusted to include the other ones of the plurality of subjects. Here each of the plurality of subjects includes a region-of-interest corresponding to a portion of an individual conference participant. Altering the second view includes determining a priority subject group and adjusting the second view to include the priority subject group. In some embodiments, the priority subject group includes two or more subjects of the plurality of subjects.

In one embodiment, a computer-implemented method includes identifying a plurality of subjects within a first view of a conferencing environment, determining one or more available subject groups, determining a priority subject group from the one or more available subject groups; and adjusting the second view to include the priority subject group. Here, each of the plurality of subjects includes a region-of-interest corresponding to a portion of an individual conference participant of a plurality of conference participants, and each available subject group includes two or more members selected from the plurality of subjects, and the two or more members can collectively fit in a second view;

In one embodiment, a video communication system includes a first camera device to provide a first field-of-view, and a second camera device to provide a second field-of-view. Here, the first camera device has a first view angle of about 90° or more, such as about 100° or more, about 110 or more °, about 120 or more °, or about 130° or more, or even about 140° or more. Here, the second camera device has directional and zoom control capability and a second view angle that is less than the first view angle. The system further includes a system controller that includes a processor and an algorithm stored in memory, and the algorithm includes a number of instructions that, when executed by the processor, cause the system controller to perform a method. The method includes identifying a plurality of subjects within a conferencing environment; determining one or more available subject groups, determining a priority subject group from the one or more available subject groups; and adjusting the second field-of-view to include the priority subject group. In some embodiments, each available subject group includes two or more members selected from the plurality of subjects, and the two or more members can collectively fit in a second field-of-view.

In one embodiment, a computer-implemented method includes determining a plurality of conference participants within a first view of a conference environment, where the plurality of conference participants including one or more priority participants and one or more non-priority participants, altering a second view of the conference environment to include the one or more priority participants and biasing the second view towards the one or more non-priority participants. Here, biasing the second view creates negative space between the one or more priority participants and at least one of the boundaries of the first view in the direction of the one or more non-priority participants.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3D are schematic representations of various conferencing situations that relate to the method of FIG. 2.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein generally relate to video conferencing systems and, more particularly, to multi-camera systems used to simultaneously monitor activity in a conference environment and auto frame a video stream of the participants in the conference environment based on the detected activity. Generally, the video-conferencing systems use a wide-angle camera (a viewfinder device) to monitor the conference environment and a pan, tilt, and zoom camera (a conference camera device) with a narrower view angle to capture a video stream of the conference environment.

Often, at least a portion of the conference environment within a field-of-view of the viewfinder device falls outside of a field-of-view of the conference camera device, even when the conference camera device is zoomed-out to provide its widest field-of-view. Thus, the field-of-view of the conference camera device may be insufficiently wide enough to capture all participants or activity within the conference environment that was detected using the viewfinder device.

Accordingly, provided herein are video communications systems and methods for grouping participants according to participant location within a conference environment, ranking the groups according to priority, selecting one of the participant groups for inclusion in a video stream based on the priority ranking, determining the desired composition of the video stream around the selected group using one or more composition rules, and adjusting the video stream to provide the desired composition. An exemplary system that may be used to perform the methods is described in FIGS. 1A-1B.

Video Conferencing System

Figure 1A:
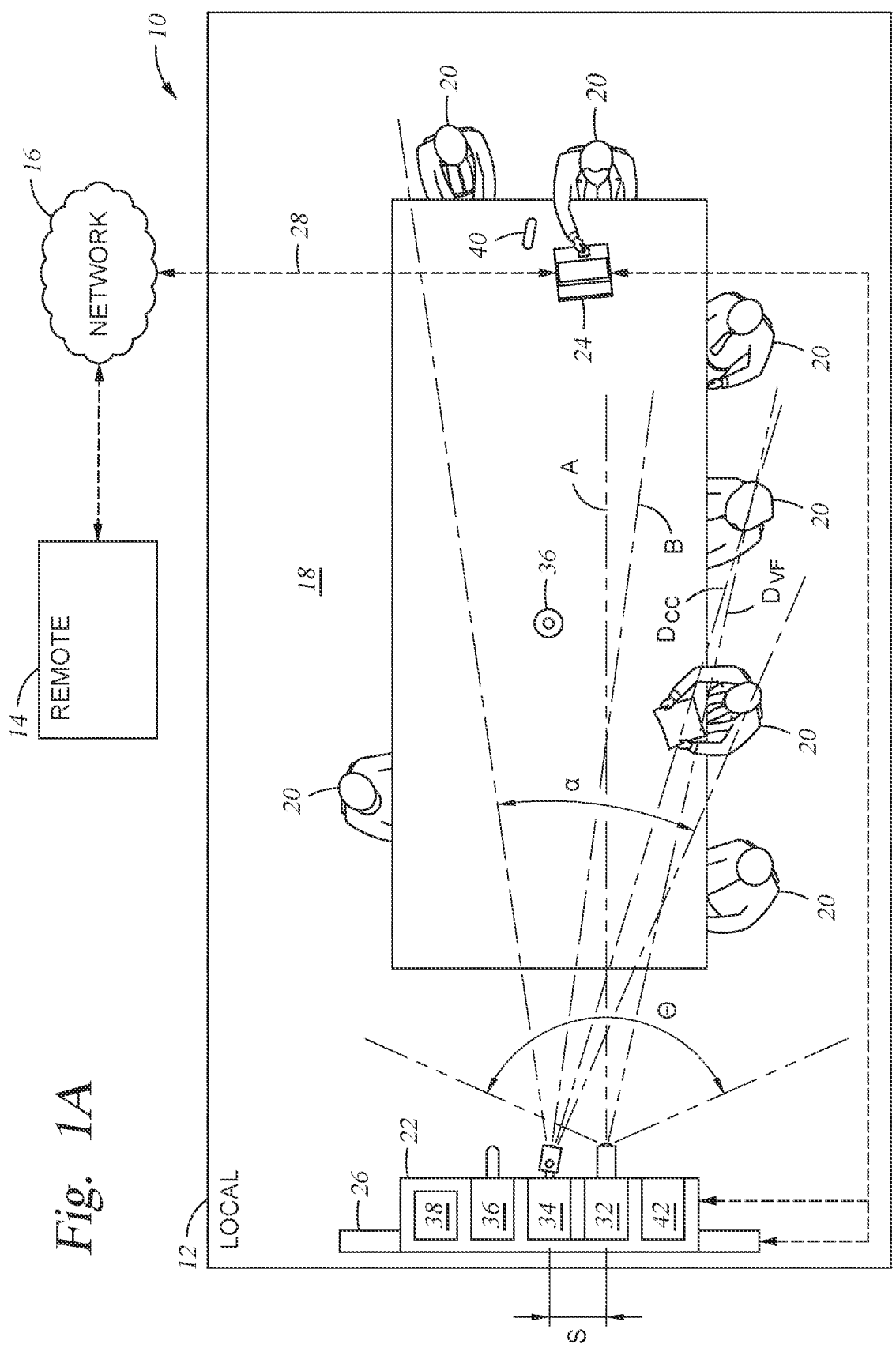
FIG. 1A schematically illustrates a video communication system, according to one embodiment, at one endpoint of a video conferencing system.
Figure 1B:
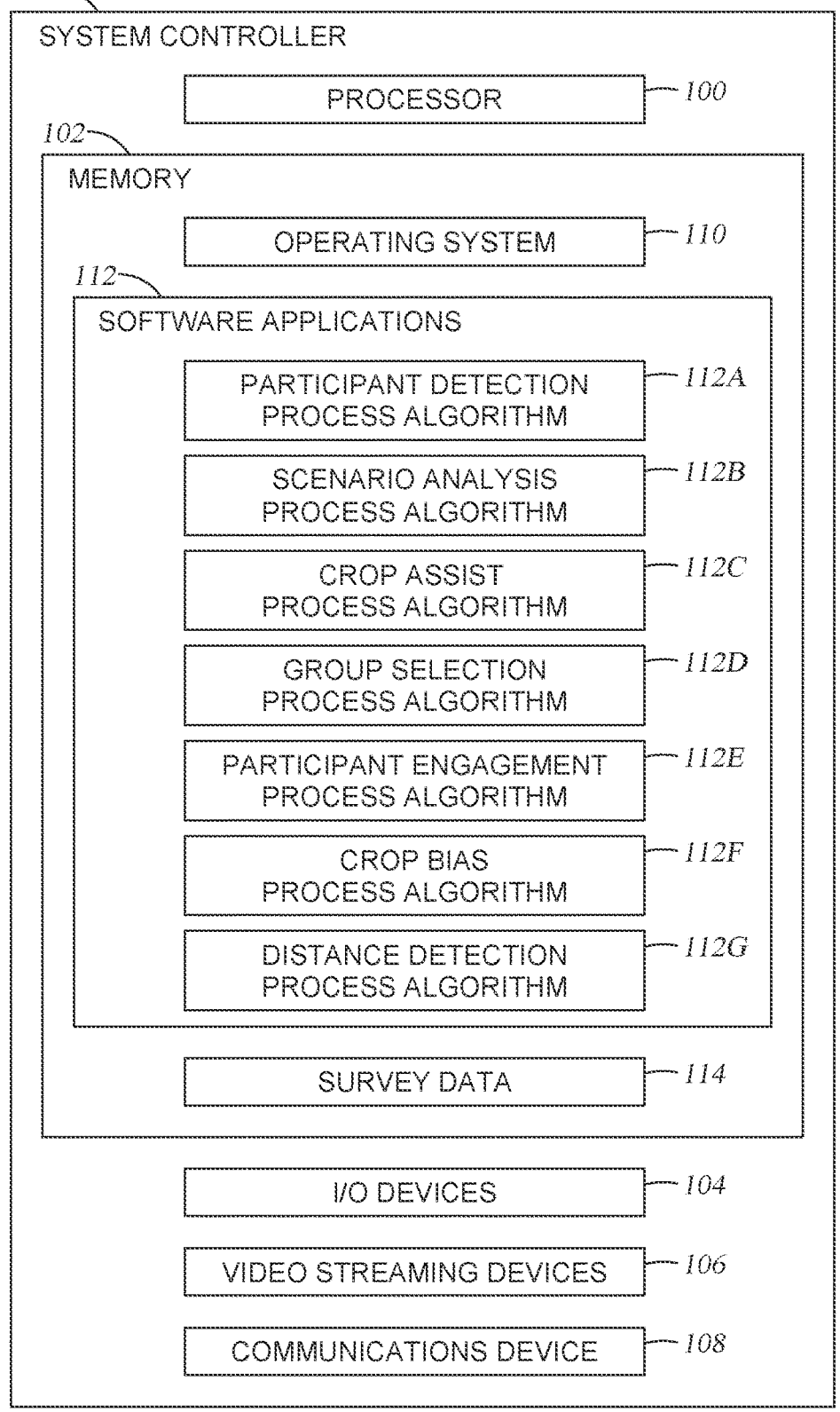
FIG. 1B is a schematic representation of a system controller of the video communication system depicted in FIG. 1A, according to one embodiment.

FIG. 1A is a schematic representation of a video conferencing system 10, according to one embodiment. Here, a local first conference endpoint 12 is linked to one or more remote conference endpoints, e.g., the second conference endpoint 14, over a network 16 that facilitates communication therebetween. As shown, the first conference endpoint 12 is located in a conference environment 18, such as a designated meeting room, having an area large enough to accommodate multiple conference participants 20. Here, the first conference endpoint 12 includes a video communication system 22 for capturing a video stream of the conference environment 18, a user device 24 for transmitting the video stream to the second conference endpoint 14 and receiving a video stream therefrom, and a display device 26 for displaying the received video stream.

The network 16 generally represents any data communications network suitable for the transmission of video and audio data (e.g., the Internet). A communication link 28 is used to support the transmission of video conference feeds that include audio and video streams between the first conference endpoint 12, the network 16, and/or the second conference endpoint 14. The communication link 28 may be formed on a network that is connected to a Local Area Network (LAN) present in each video conference location and/or across multiple video conference locations on a Wide Area Network (WAN).

In one embodiment, the communication link 28 utilizes a wired or wireless communication technique to transmit data between the video conferencing locations. Wireless communication techniques can include but are not limited to a cellular phone network, WiFi network, satellite communication network, or other useful wireless communication techniques. Wired communication techniques may include but are not limited to fiber, cable, or DSL type data transmission methods/technologies.

Here, the video communication system 22 includes a viewfinder device 32, a conference camera device 34, one or more microphones 36, a system controller 38, and an optional remote user interface 40. The viewfinder device 32 is used by the system controller 38 to monitor activity in the conference environment 18, e.g., to detect the locations of conference participants 20 within a field-of-view of the viewfinder device 32. The conference camera device 34 is used by the system controller 38 to frame a desired view of the conference environment 18 based on the detected locations and/or activities of the conference participants 20 and capture a video stream of the desired view for display at the second conference endpoint 14. In some embodiments, the viewfinder device 32 and the conference camera device 34 are disposed within a housing of the video communication system 22, coupled to a common support member, and/or are coupled to one another to define a fixed distance S therebetween. The fixed distance S between the viewfinder device 32 and the conference camera device 34 may be used to determine distances between the video communications system 22 and conference participants 20 by use of the distance detection algorithm 112G, according to one embodiment, as further described below.

Generally, the viewfinder device 32 is equipped with a lens and an image sensor, which in combination provide a relatively wide field-of-view to facilitate monitoring of the conference environment 18. The field-of-view may be defined, at least in part, as the angular extent of a scene that may imaged by a camera device. In FIG. 1A the angular extent of the scene, which may be imaged by the viewfinder device 32, is shown as a viewing angle θ. Generally, the viewing angle θ is symmetrical about an optical axis A of the viewfinder device 32 such that a viewing angle θ of 90 degrees would provide an angle of coverage +/−45 degrees with respect to the axis A. In some embodiments, a suitable viewfinder device 32 may be selected to provide a viewing angle θ of between about 90 degrees and about 160 degrees. For example, the viewfinder device 32 may be selected to have a viewing angle of 90 degrees (+/−45 degrees from the optical axis A), may be selected to have a viewing angle θ of 160 degrees, e.g., (+/−80 degrees from axis A), or may be selected to have a viewing angle θ that is an angle between 90 degrees and 160 degrees (between +/−45 degrees and +/−160 degrees from the axis A).

In some embodiments, the viewfinder device 32 is selected to provide a viewing angle θ of about 80 degrees or more, such as about 90 degrees or more, about 100 degrees or more, about 110 degrees or more, about 120 degrees or more, about 130 degrees or more, or about 140 degrees or more. In some embodiments, the viewing angle θ is an angle of between about 80 degrees and about 200 degrees, or between about 90 degrees and about 190 degrees, between about 100 degrees and about 180 degrees, between about 110 degrees and about 170 degrees, for example, between about 120 degrees and about 160 degrees. The lens of the viewfinder device 32 may be a rectilinear lens or a curvilinear (non-rectilinear) lens, also known as a fisheye lens. Rectilinear lenses typically have reduced barrel distortion when compared to curvilinear lenses, e.g., by yielding images where straight features of a feature appear as straight lines in the image. Curvilinear lenses may provide a wider viewing angle than rectilinear lenses but typically yield images with stronger visual distortion. However, it should be noted that a wide-angle, rectilinear lens may still cause visual distortion in situations where the subject-to-lens distance is relatively short, such as a conference participant 20 sitting relatively close to the viewfinder device 32.

Due, at least in part, to the undesirable distortion of conference participants 20, a video stream captured by the viewfinder device 32 may be considered as less than optimal for display at the second conference endpoint 14. Thus, the conference camera device 34 is used to capture a relatively low-distortion, high-resolution video stream to-be-transmitted for display at the second conference endpoint 14. Typically, a viewing angle α of the conference camera device 34 (at 1× zoom) is less than the viewing angle θ of the viewfinder device 32, such as about 0.9× of the viewing angle θ or less, about 0.8× or less, about 0.7× or less, about 0.6× or less, for example, about 0.5× or less. In some embodiments, the conference camera device 34 has a view angle α (at 1× zoom) of about 110 degrees or less, about 100 degrees or less, or about 90 degrees or less.

Often, when the video communication system 22 is used in a relatively large conferencing environment, at least a portion of conference environment 18 within the field-of-view of the viewfinder device 32 will fall outside of a field-of-view of the conference camera device 34. Thus, to allow for capture and transmission of a desired view of the conference environment 18 and facilitate the methods set forth herein, the conference camera device 34 is configured for remote directional and zoom control, e.g., having pan, tilt, and zoom (PTZ) adjustment capability.

In some embodiments, the video communication system 22 further includes a depth sensor 42. The depth sensor 42 may be any sensor(s), sensor array(s), or other device(s) suitable for determining relative distance or depth information related to participants 20 within the conferencing environment 18. The depth information includes distances between each of the participants 20 and one or both of the viewfinder device 32 and the conference camera device 34. In some embodiments, the depth sensor 42 comprises a time of flight (TOF) range finding system which employs TOF techniques to determine the distance between the viewfinder device 32 and/or the conference camera device 34 and each of the participants 20. Typical TOF techniques measure the round trip time of light emitted from a pulsed light source, e.g., a laser or an LED, to surfaces in the scene and reflected back to a sensor or an array of sensors of the depth sensor 42. Distance information is then calculated using the round trip time and the speed of light.

In some embodiments, the depth sensor 42 may be configured to determine relative distances of surfaces in a desired scene using two or more stereo images taken using a corresponding number lens/image sensor combinations. For example, in some embodiments, the depth sensor 43 may include at least two lens and image sensor combinations, disposed in a fixed relationship to one another, i.e., a fixed distance apart so that each has a slightly different view of the conference environment. Thus, the same features within images generated by each lens and sensor combination will have different pixel coordinates (within the image) from one another. A relatively large distance between pixel coordinates for an object indicates that the object is closer to the camera device than would a relatively small distance, which would indicate that the object is further away. Images generated by each lens and sensor combination are overlaid, and the distance between pixels in each image corresponding to the same objects within a scene are used to determine a relative distance of the objects to the depth sensor 42.

In some embodiments, distance information, such as the distance $D_{VF}$ between the viewfinder device 32 and a conference participant 20, or the distance $D_{CC}$ between the conference camera device 34 and the conference participant 20 may be determined without the use of the depth sensor 42, e.g., by use of a distance detection process algorithm 112G. In one embodiment, the distance process algorithm 112G is trained by use of a convolutional neural network (CNN) through a supervised or unsupervised learning framework. The distance detection process algorithm 112G is trained to estimate depth from a two-dimensional (2D) image based on inferred 3D geometries within the conference environment 18. In some embodiments, the distance detection process algorithm 112G is trained to use a combination of a motion of the conference camera device 34, e.g., the ego-motion provided by directional control of the convergence camera device across a plurality of sequentially acquired images, and inferred 3D geometries within those images to determine the distance $D_{CC}$ to individual conference participants 20.

In other embodiments, the distance detection process algorithm 112G determines the distance $D_{CC}$ from the conference camera device 34 to individual conference participants 20 using one or more geometric formulas. For example, the distance DCC may be geometrically determined based on the distance S between the viewfinder device 32 and the conference camera device 34, the shift of objects or subjects within images captured by the viewfinder device 32 and the conference camera device 34, respectively, inferred 3D geometries of objects or subjects within the conference environment 18, and/or the angular coordinates of an object or subject within one or both of the viewfinder device 32 and the conference camera device 34. In one embodiment, the distance detection process algorithm 112G uses an inferred head size of the conference participant 20 to determine the distance $D_{CC}$ to the conference participant 20. The inferred head size may be an average diameter for the human head, e.g., between about 15 cm and about 20 cm, or may be determined by the use of a convolutional neural network.

Here, operation of the viewfinder device 32, the conference camera device 34, and the one or more microphones 36, and processing of video and audio data received therefrom is facilitated by the system controller 38, which then transmits the video and audio data to the user device 24.

Generally, the system controller 38 includes a processor 100, memory 102, input/output (I/O) devices 104, a video streaming device 106, and a communications device 108, which are operably coupled to one another using one or more support circuits (not shown). In some embodiments, a combination of two or more of the processor 100, memory 102, I/O devices 104, video streaming device 106, and the communications device 108 are integrally formed with one another on a single substrate, e.g., to form a system on a chip (SOC) device.

The processor 100 may be any one or combination of a programmable central processing unit (CPU), a graphics processing unit (GPU), a digital signal processor (DSP), an image signal processor (ISP) that is a specialized DSP used for image processing, a programmable gate array (FPGA), an application-specific integrated circuit (ASIC), a neural network coprocessor, or other hardware implementation(s) suitable for performing the methods set forth herein, or portions thereof. The memory 102, coupled to the processor 100, is non-transitory and represents any non-volatile type of memory of a size suitable for storing one or a combination of an operating system 110 and one or more software algorithms 112.

Examples of suitable memory that may be used as the memory 102 include readily available memory devices, such as random access memory (RAM), flash memory, a hard disk, or a combination of different hardware devices configured to store data. In some embodiments, memory 102 includes memory devices external to the system controller 38 and in communication therewith. In some embodiments, at least one of the one or more software algorithms 112 are executable by the processor 100 to perform one or more of the methods set forth herein, which advantageously simplifies integration across generally available video conferencing software applications. In other embodiments, one or more of the methods may be executed by one of a general-purpose computer or a custom electronic device external to the video communication system 22 and in wired or wireless communication therewith. In some embodiments, the one or more software algorithms 112 stored in memory 102 include instructions which, when executed by the processor 100, are configured to perform one or more of the methods described herein.

The video streaming device 106 and the communications device 108 are generally configured to facilitate the transfer of video data (e.g., video data captured using the conference camera device 34) to the second conference endpoint 14 for display. In some embodiments, the video communication system 22 further includes a user interface 40, e.g., a remote control, disposed in wired or wireless communication (e.g., WiFi, Bluetooth®) with the system controller 38. The user interface 40 may be used to manually override at least some of the methods set forth herein when manual control over the video communication system 22 is so desired.

Here, the user device 24 is used to execute a video conferencing software application to transmit the processed video and audio data to the second conference endpoint 14 via the communication link 28. The user device 24 may transmit the video data to the second conference endpoint 14 using conventional communication devices and protocols (e.g., network interface card, Ethernet card, modem, wireless network hardware, or other conventional computing device communication hardware). The user device 24, using the video conferencing software application, receives data from the second conference endpoint 14 via the communication link 28 and displays a video stream therefrom, e.g., by use of the display device 26.

Typically, a processor (e.g., CPU) within the user device 24 is used to execute a video conferencing software application capable of transmitting data (e.g., video data) received from the system controller 38 to the second conference endpoint 14 and receiving video data from the second conference endpoint 14. Examples of such video conferencing software applications include, without limitation, Microsoft® Skype®, Apple® FaceTime®, and applications available from Zoom® Video Communications, Inc. More generally, however, any video conferencing software application capable of receiving video data and transmitting the video data to a remote site can be used, consistent with the functionality described herein. The video data received from the second conference endpoint 14 may be displayed on one or both of the display device 26 (e.g., LED television, OLED television, plasma display) and/or on a native display of the user device 24.

Although described separately above, it is contemplated that any combination of the individual components and functions of the system controller 38 may be included in and/or performed by the user device 24 and vice versa, including the execution of the one or more software algorithms 112 for performing any one or combination of the methods set forth below.

As described above, when used in a relatively large conferencing environment 18, at least a portion of conference environment 18 within the field-of-view of the viewfinder device 32 will fall outside of a field-of-view of the conference camera device 34. Thus, the field-of-view of the conference camera device 34 may be insufficiently wide enough to capture all participants 20 or activity within the conference environment 18 (detected using the viewfinder device 32). The resulting visual conferencing experience provided to a remote viewer may have some similarities with the visual experience of people physically located within the same physical environment, e.g., an in-person participant in the same conference room. For example, like the remote viewer, a local participant may not be able to simultaneously observe all other local participants in the conference room in detail. This is due to the inherent limits of a human's field of view, where the central vision (that allows a person to observe objects in detail) has an angle of about 90°. However, unlike the remote viewer, local in-person participants have the benefit of peripheral vision and a knowledge of where the other local in-person participants are located in the conference room. Thus, in a typical meeting situation, in-person participants choose where to look based on others' engagement and activities but are unlikely to swivel their head around every time a new participant speaks, no matter how briefly. Unfortunately, a remote participant viewing a video stream of the same conference environment typically does not have the benefit of choosing the view of the video stream or the peripheral vision and spatial awareness to allow for the same level of engagement as they would otherwise have if they were in the same physical location. Accordingly, embodiments herein provide for automatic framing for a variety of conference scenarios that may be experienced by a remote viewer in order to improve the conference experience of the remote viewer.

Generally, in embodiments herein, the video communications system 22 is configured to determine a group of participants for inclusion in the video stream based on an applicable conference scenario from a plurality of pre-defined conference scenarios. The group of participants selected for inclusion in the video stream, e.g., the "priority group," may be determined using a group selection process set forth in the methods below. In some embodiments, the method further includes determining the desired composition of the video stream based on the applicable conference scenario and one or more composition rules and adjusting the video stream to provide the desired composition.

Typically, the video communication system 22 determines the priority group and composition of the video stream at the beginning of the conference session and as needed based on changes in participants and activity during the conference session. In some embodiments, the methods use one or more algorithms to determine when a change in the conference session is significant enough to warrant adjusting the video stream, thus preventing frequent and undesirable changes to the video stream that would be disconcerting and/or annoying to a remote viewer. In some embodiments, the method further includes adjusting the video stream to provide a biased (asymmetrical) composition based on the location(s) of one or more out-of-frame participants. Beneficially, biasing the video stream provides a remote viewer with context cues and spatial awareness of the relative locations of other conference participants in the conference environment.

A method for determining an applicable conference scenario, process algorithms may be used to perform portions of the methods, and schematic representations depicting aspects of the method are illustrated in FIGS. 2-6 and described below.

Video Conferencing Methods

Figure 2:
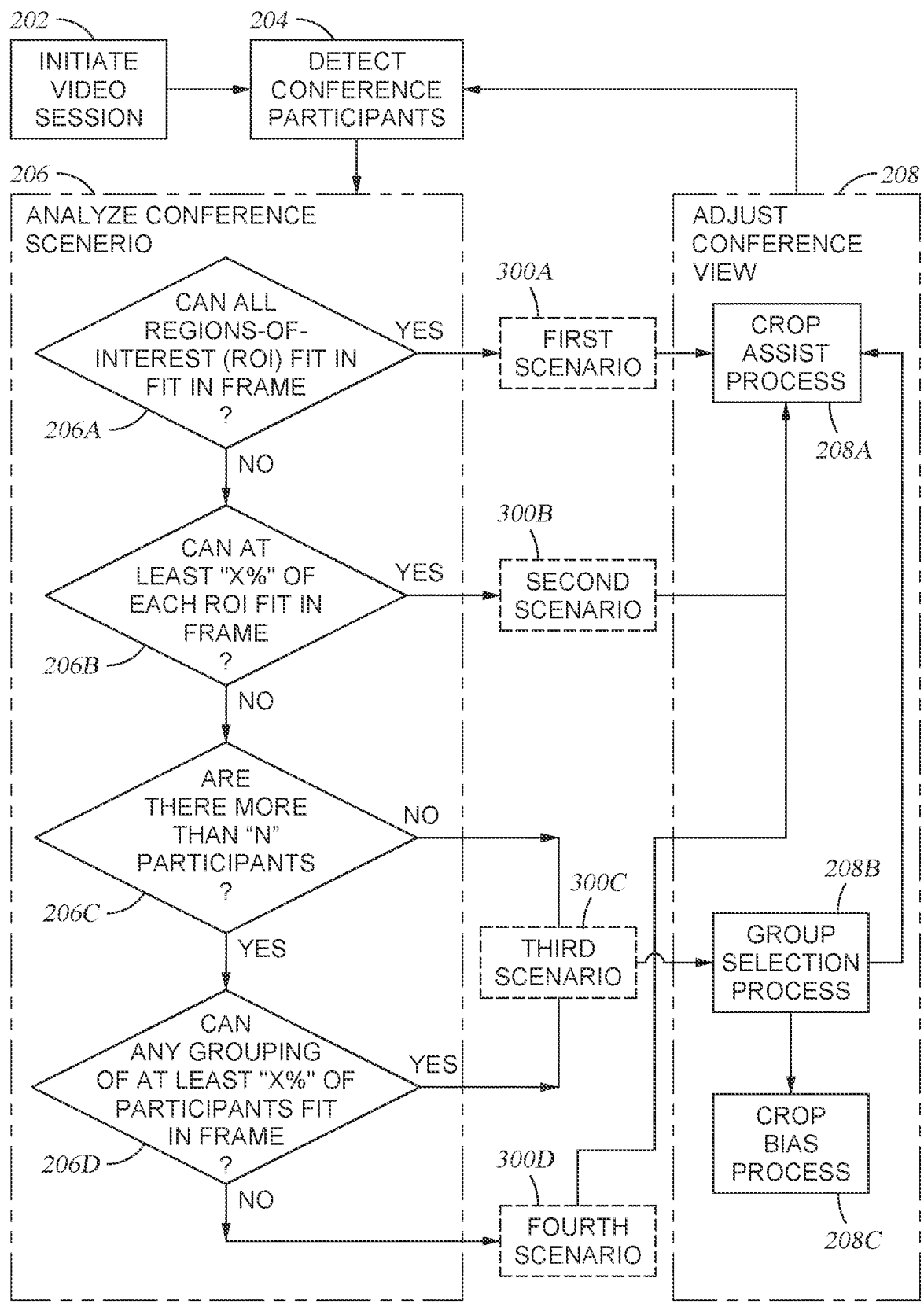
FIG. 2 is a diagram illustrating a video-conferencing method that may be performed with the video communication system of FIGS. 1A-1B, according to one embodiment.

FIG. 2 is a diagram illustrating a method 200, according to one embodiment, for adjusting a to-be-transmitted view (display view) of a video stream of a conference environment based on a state of the conference room environment, e.g., the number and locations of participants detected therein, which is also referred to herein as the conference state. The method 200 may be performed using the video communication system 22 described above or any other suitable video communication system where automatic grouping and framing of more than one region of interest is desired. Aspects of the method 200 are schematically illustrated in FIGS. 3A-3D.

Here, the method 200 is performed using one or more software algorithms 112, e.g., process algorithms 112A-E, which are executed by use of the processor 100 and resides in the memory 102 of the system controller 38. The software algorithms 112 may include one or more algorithms that can be trained to better perform a desired method or function, such as a machine-learning artificial intelligence (AI) algorithm or by use of a convolutional neural network (CNN).

At activity 202, the method 200 begins by initiating a video-conferencing session in a conference environment 302. Initiating the video-conferencing session includes "surveying" the conference environment 302 by acquiring a plurality of image frames (survey frames) using the viewfinder device 32, where the field-of-view of the viewfinder device 32 provides a survey view 304. Typically, the survey frames are analyzed at the beginning of the video-conferencing session, e.g., to detect conference participants 306, and periodically throughout the video-conferencing session to detect changes in the video-conferencing session, such as participants leaving, participants changing location, new participants joining, changes in participant activity (changes in who is speaking) and shifting participant engagement levels. Analyses of the survey frames generates survey data 114, which is stored in the memory 102 the system controller 38, and used by the processor 100, for further analysis to facilitate the methods herein.

At activity 204, the method 200 continues with analyzing survey information (survey frames and/or survey data) to detect one or more conference participants 306 in the conference environment 302 and to determine the respective locations of the conference participants 306. Analyzing the survey information may include using the participant detection process algorithm 112A, which is executed by the processor 100, to detect and/or recognize conference participants 306 located within the survey view, e.g., by use of machine-learning artificial intelligence (AI) algorithm or a convolutional neural network.

Here, the participant detection process algorithm 112A defines a region-of-interest (ROI) 308 for each participant 306 that corresponds to a portion of the participant 306 that is desired for inclusion in the to-be-transmitted video stream (conference video). The regions-of-interest 308 are shown in FIGS. 3A-3D as rectangular boxes surrounding the upper body portion, e.g., torso and head portion of each participant 306, but any desired shape may be used to surround any desired portion of the participant 306, such as the physical head and shoulder portions of the participant 306. In some embodiments, the video communications system 22 further comprises a thermal sensor (not shown) such as an IR sensor, used to determine detect a thermal signature of participants 306. In those embodiments, the ROI 308 may comprises the visible higher temperature portion(s) corresponding to the conference participants 306.

Here, the ROI 308 is used to facilitate portions of the method 200, such as determining the locations of a participant 306 within a survey frame or the extent to which a participant is only partially included within a reference frame 310A. Information comprising the number and locations of the conference participants within the boundaries of the survey frame is stored in the memory 102 of the controller 38 as the survey data 114.

At activity 206, the method 200 includes analyzing one or both the survey frames or survey data 114 to determine an applicable conference scenario from a group of pre-defined conference scenarios 300A-D. Here, activity 206 is performed by the scenario analysis process algorithm 112B, stored in the memory 102 and executed by the processor 100, which uses the algorithm illustrated in blocks 206A-E.

Activity 206 is used to determine a preferred composition of the conference video based on the relative locations of participants 306 and the ability of the conference camera device 34 to frame all or a subset (group) of the conference participants 306 using directional and zoom capabilities. At activity 206, the scenario analysis process algorithm 112B uses a reference frame 310A to determine the ability of the conference camera device 34 to frame all or a group of the conference participants within its field-of-view. Here, the reference frame 310A is shown as a rectangular box to facilitate understanding of the method 206. However, it is contemplated that the reference frame 310A may comprise any mathematical expression or algorithm used to determine if a group of conference participants can fit within a defined area having a desired size, shape, and/or aspect ratio. In some embodiments, the size, shape, and/or aspect reference frame 310A corresponds to a field-of-view of the conference camera device 34. In other embodiments, the size, shape, and/or aspect ratio of the reference frame 310A are provided as predetermined set points, which may not correspond to the field-of-view of the conference camera device 34. In some embodiments, the size, shape, and/or aspect ratio of the reference frame 310A is input by a user of the video communications system 22.

At block 206A, the method 200 includes determining if the regions-of-interest 308 defined for each participant 306 will fit within a reference frame 310A having the size and aspect ratio of a field-of-view of the conference camera device 34. If all of the regions-of-interest 308 fit within the reference frame 310A, the conference state meets the criteria of the first scenario 300A (shown in FIG. 3A), and the method 200 continues to block 208A. At block 208A the field-of-view of the conference camera device 34 may be adjusted to provide the desired conference view using the crop assist process algorithm 112C executed by the processor 100 and described in the method 600 of FIG. 6 below. If all of the ROI 308 do not fit within reference frame 310A, the method continues to block 206B.

At block 206B, the method 200 includes determining if at least a portion of each ROI 308 fits in the frame so that each identified participant 306 would be at least partially visible in the conference video. Depending on the boundary of the frame, e.g., where the participant is cropped, it may be desirability to include the participant in the conference view, even though a cropped view that cuts off a portion of the participant is less than desirable. The cropped view may be less than desirable, e.g., distracting to remote viewers of the conference video if too much of the participant is cropped from the frame. Thus, block 206B further includes determining whether the portion of the ROI 308 that fits within the reference frame 310A meets a threshold of $X_1$, such as about 40% or more of the ROI 308, about 50% or more, or about 60% or more. If at least a portion of each ROI 308 fits within the frame, and the portion which fits within the reference frame 310A is equal to or greater than the threshold $X_1$, the conference situation meets the criteria for the second scenario 300B illustrated in FIG. 3B. If the conference situation meets the criteria for the second scenario 300B, the method 200 continues to block 208A.

If the conference situation at block 206B does not meet the criteria for the second conference scenario 300B, i.e., if one or more ROI 308 cannot be included in the reference frame 310A or if the portion of the ROI that cannot be included in the reference frame 310A is less than the threshold $X_1$, the method 200 continues to blocks 206C and 206D.

Blocks 206C and 206D are used together to determine whether a conference situation that does not meet the criteria the conference scenarios 300A-300B, would benefit from the grouping selection process at block 208B. Generally, the group selection process allows the system controller 38 to ignore one or more conference participants in the conference environment 302 in favor of a group of participants selected based on one or more group selection criteria. The group selection process may be used to provide an improved conference view when the conference camera device 34 is unable to capture all conference participants within its field-of-view. FIG. 3C illustrates a third conference scenario 300C, where the composition of the conference view can be improved using the group selection process in block 208B.

FIG. 3D illustrates a fourth conference scenario 300D, e.g., a "crowd scenario" where, due to the number and locations of participants, no particular grouping of conference participants is likely to provide an improved conference view over any other grouping.

At block 206C, the method 200 includes determining whether the number of participants is large enough to exceed a predetermined threshold N, e.g., 8 or more participants, 9 or more, 10 or more, 11 or more, or 12 or more participants. If the number of participants meets or exceeds the threshold N, the method 200 continues to block 206D. If the number of participants is less than the threshold N, and the conference situation does not meet the criteria for the conference scenarios 300A and 300B, the conference situation meets the criteria for the third conference scenario 300C, and the method 200 proceeds to block 208B.

At block 206D, the method 200 includes determining whether the number of participants in any grouping of participants that would fit in the reference frame 310A, compared to the total number of participants detected in the conference environment, meets or exceeds a threshold value. In other words, can any grouping of at least $X_2$ % of participants fit in the reference frame 310A, where $X_2$ is about 20% or more, about 25% or more, about 30% or more, about 35% or more, or for example, about 40% or more. If the number of participants meets or exceeds the threshold N and a grouping of at least $X_2$ % of participants fits in the reference frame 310A, the conference situation meets the criteria for the fourth conference scenario 300D, illustrated in FIG. 3D, and the method proceeds to block 208A. If one or more groupings of at least $X_2$ % of participants will fit in the reference frame 310A, the conference situation meets the criteria for the third conference scenario 300C, and the method 200 proceeds to block 208B.

At activity 208, the method 200 includes adjusting the field-of-view of the conference camera device 34 to provide the desired composition (conference view) of a to-be-transmitted video stream (conference video). Here, activity 208 is performed using the algorithm illustrated in blocks 208A-C. Based on the applicable conference scenario determined at activity 206, adjusting the conference view at activity 208 includes adjusting the crop of the conference view at block 208A (first, second, and fourth scenarios 300A,B,D), or determining the desired grouping of participants at block 208B (third scenario 300C). For the third scenario 300C, the method continues to one of block 208A or to block 208C. A method 400, which may be used to perform blocks 208B and 208C, is described in FIG. 4. A method 600, which may be used to perform the crop adjustment at block 208A, is described in FIG. 6.

Figure 4:
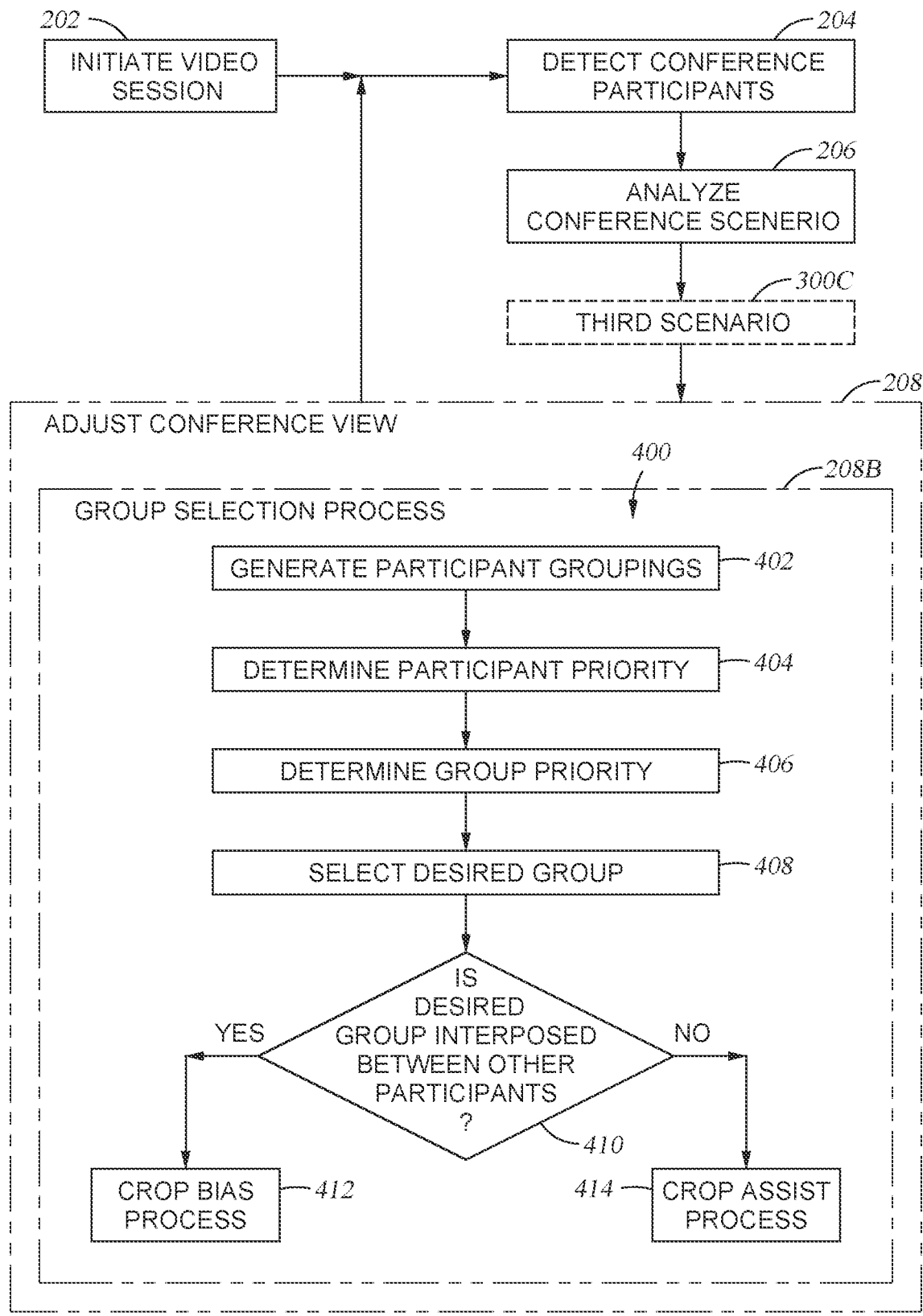
FIG. 4 is a flow diagram illustrating a crop-adjustment process, according to one embodiment, which may be used with the method illustrated in FIG. 2.

FIG. 4 is a flow diagram illustrating a method 400 for determining a desired grouping of participants, herein a priority group, to be included in the conference video and framing the conference view around the desired grouping according to one or more crop bias or crop composition rules. Here, the method 400 is performed by the group selection process algorithm 112D, stored in the memory 102 and executed by the processor 100. FIGS. 5A-5D are schematic representations of conference environments used to illustrate aspects of the method 400.

At activity 402, the method 400 includes analyzing the respective locations of a plurality of conference participants 506 (FIG. 5A) within a survey view 304 and determining, based on one or more grouping rules, the possible (available) participant groups 503 that may be formed therefrom.

Figure 5A:
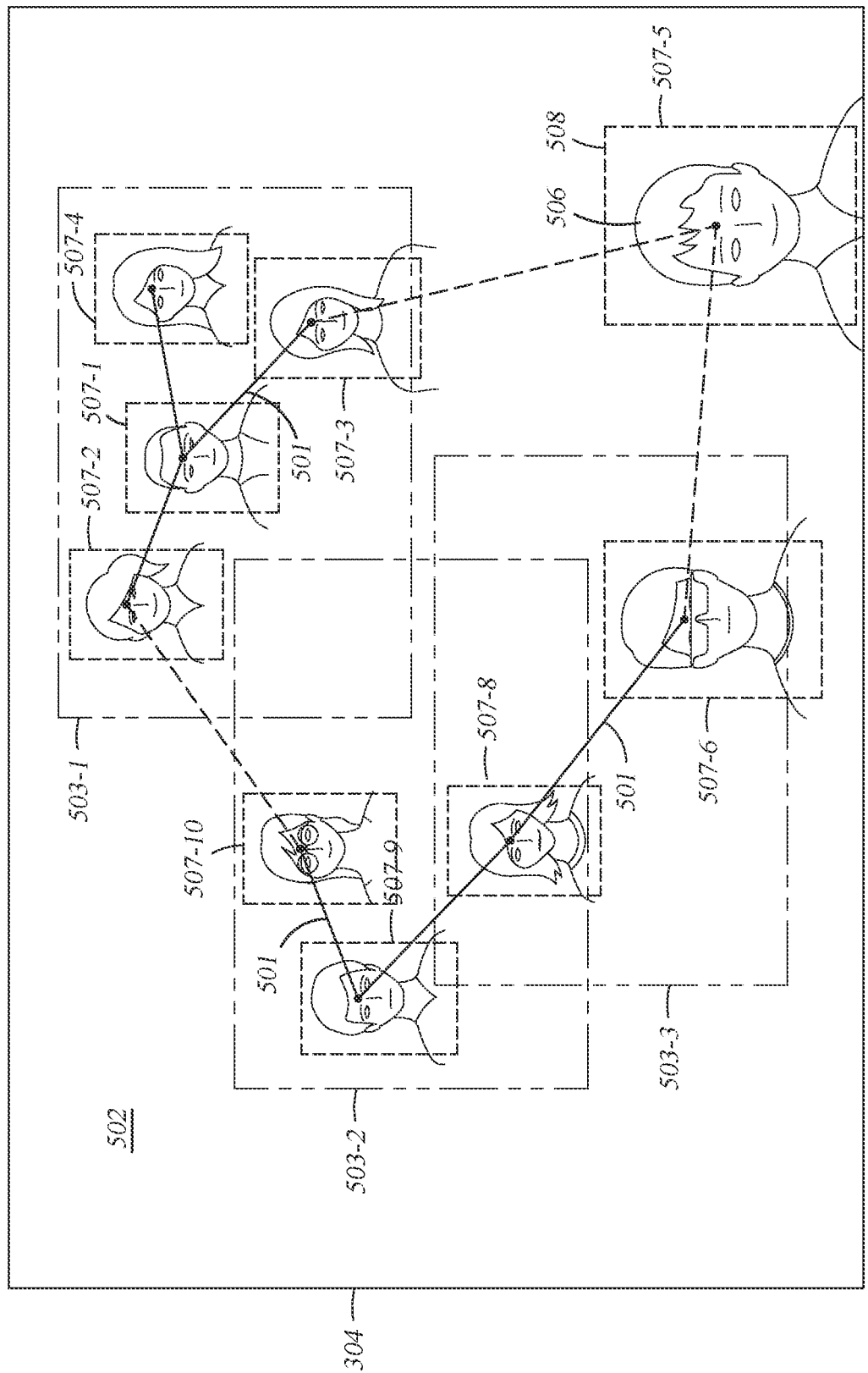
FIGS. 5A-5C are schematic representations of various conferencing situations that relate to the method of FIG. 2.

In one embodiment, possible participant groups 503 are determined, during activity 402, using a priority tree 501. In FIG. 5A, a priority tree 501 is started for a first group 503-1, beginning with a first subject 507-1. Each of the subjects 507-1 to 501-10 comprises a region-of-interest 508 corresponding to a portion of an individual conference participant 506. Here, new members are sequentially added to the first group 503-1 based on their distance (closeness) to any other of the previously added members of the group, shown here as sequentially added subjects 507-2, 507-3, and 507-4. The distance between members can be determined, for example, by use of various detection processes that can include the use of one or more software algorithms executed by the processor 100 and the depth sensor 42 described above. The priority tree 501 ends if at least a portion (of the ROI 508) of the next closest member falls outside of a reference frame 310A, e.g., here subject 507-5 falls outside of the reference frame 310A for the priority tree of the first group 503-1 and thus will not be included as a member in the first group 503-1. The process is repeated with a new priority tree 501, beginning with each of the plurality of subjects 507-1 to 507-10, until all possible participant groups 503 are identified (three shown in FIG. 5A).

At activity 404, the method 400 includes determining a priority rating for the individual conference participants 506. The priority rating for an individual participant is used to indicate the desirability of including the individual participant in the conference video. The priority rating is typically based on factors that indicate the likelihood and degree of engagement of a conference participant in a video-conferencing session. Such factors may include but are not limited to the location of a participant in the conference environment and the behaviors of the participant during the conference session. For example, location factors may include whether the participant is located at or near the head of a conference table, away from the conference table in a chair against a wall, at or near a podium, and/or the relative distance of the participant to the conference camera device 34 compared to other participants. In some embodiments, participants within a first zone, which are positioned a preferred distance from the conference camera device 34, such as from about 0.5 meters to about 7 meters from the conference camera device 34, such as within from about 1.5 meters to about 4 meters, will receive a higher priority rating than equivalent participants in front of (closer to the conference camera device 34) or behind the first zone (further away from the conference camera device 34). In some embodiments, participants who are located towards the center of the survey view 304 (when viewed from left to right) will receive a higher priority rating than an equivalent participant located towards the periphery of the survey view 304.

Behavior factors may include noise generated by the participant and how long the participant engages with potential distractions. Noise-related behavior factors can be detected by use of the microphone 36 and processed by use of an algorithm stored in memory 102. The noise-related behavior factors can include talking time and/or talking frequency for the participant. Potential distractions can include engagement with personal electronic devices, e.g., a laptop, cellphone, or side conversations with another conference participant.

In some embodiments, activity 404 is performed using a participant engagement process algorithm 112E, which is stored in the memory 102 and executed by the processor 100.

At activity 406, the method 400 includes determining a priority rating for each of the possible participant groups 503 identified at activity 402. Generally, the group priority ratings are determined using the combined priority ratings of the individual members (participants) of the group and/or one or more group characteristics. Group characteristics may include the distances of the individual members from one another, (e.g., in the survey view 304 and/or in a depth direction from the conference camera device 34), an average distance of the group to the conference camera device 34, and the position of the group within the conference environment 302 when viewed from the viewfinder device 32 (e.g., right to left, back to front, corner to corner). In some embodiments, a group 503 where members are positioned towards the center of the survey view 304 will have a higher rating than an equivalent group positioned to either side of the survey view 304.

At activity 408, the method 400 includes selecting a desired priority group from the plurality of available groups 503. Generally, the priority group is selected based on the group priority rating. In some embodiments, a local or remote user may select the priority group based on the available participant groups 503 identified at activity 402. In some embodiments, the priority ratings for the individual participants 306 and the available participant groups 503 are provided to the local or remote user to inform their selection.

In some embodiments, selecting the priority group includes changing the status of participants who are not members of the selected group so that the non-member participants are not considered when determining the boundaries of the conference view, using any one or combination of the methods described herein. Typically, the conference environment is monitored throughout a video conference session, e.g., by use of the viewfinder device 32, to detect changes in the video-conferencing session and respond appropriately. Thus, the group selection process can be repeated throughout the conferencing session, and changes in participant location and/or the number of participants may cause changes to the members of the possible participant groups 503. Similarly, changes in participant behavior during the course of a video-conferencing session may cause changes in participant priority scores and the group priority ratings determined therefrom.

When the priority ratings of two or more groups are relatively close, minor changes in priority ratings may cause the ranking of groups to shift, resulting in frequent and undesirable adjustments in the conference view. To prevent such undesired adjustments, the priority ratings of members of a group selected as the priority group may be increased by a sticking factor, such as increased by a multiplier of about 1.2× or more, or 1.5× or more. The sticking factor ensures that the relatively minor changes in the priority ratings of other participants will not be enough to change the conference view from an earlier selected priority group.

At activity 410, the method 400 includes determining whether the priority group is located to one side or the other of the conference environment and the other participants therein or is located between conference participants. If the priority group is located to a side of the other conference participants, the method 400 proceeds to activity 412. If other participants are located on either side of the priority group 507, the method 400 proceeds to activity 414. Activities 410 and 412 may be performed using the crop bias process algorithm 112F, stored in the memory 102 and executed by the processor 100.

Figure 5B:
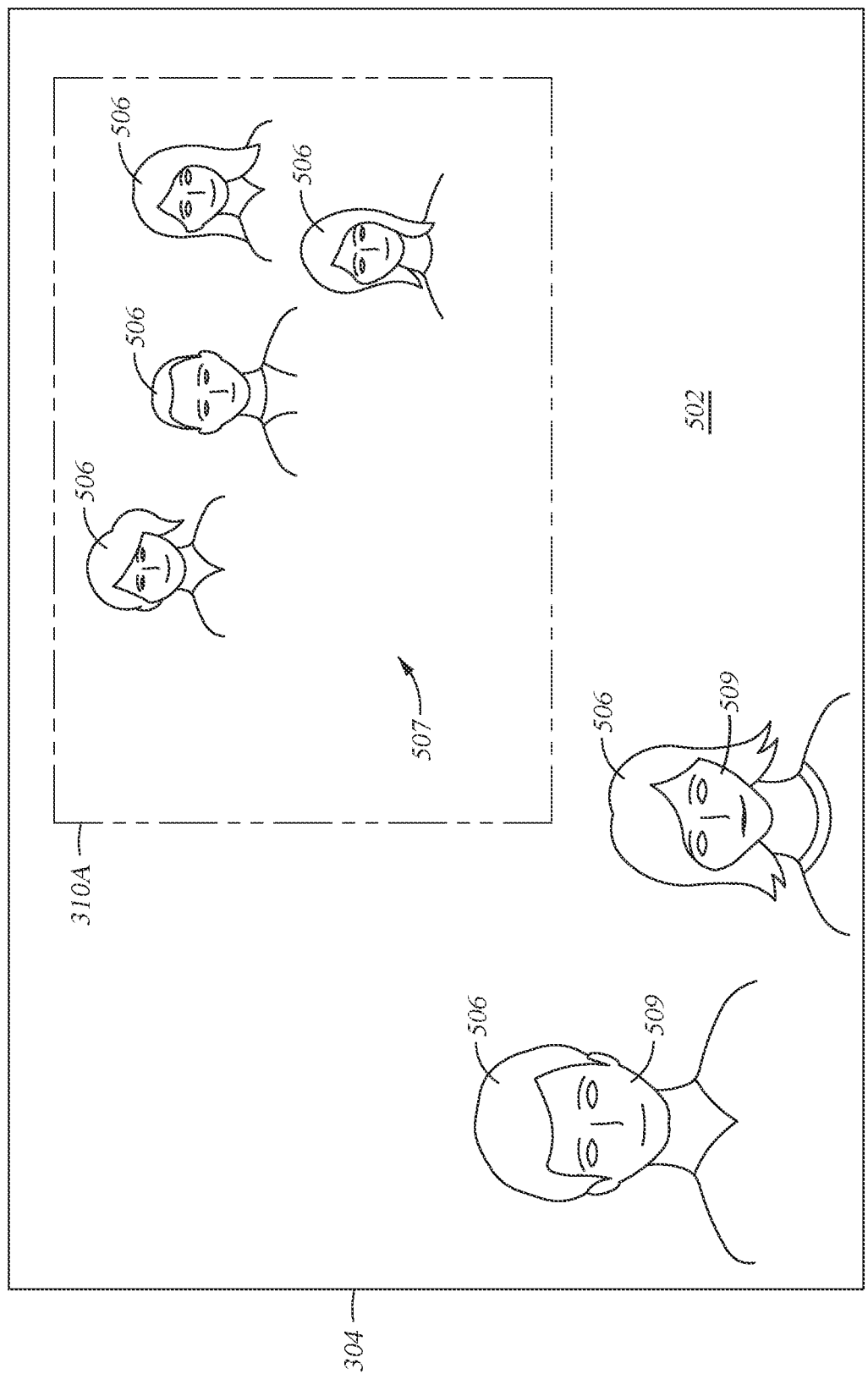
Figure 5C:
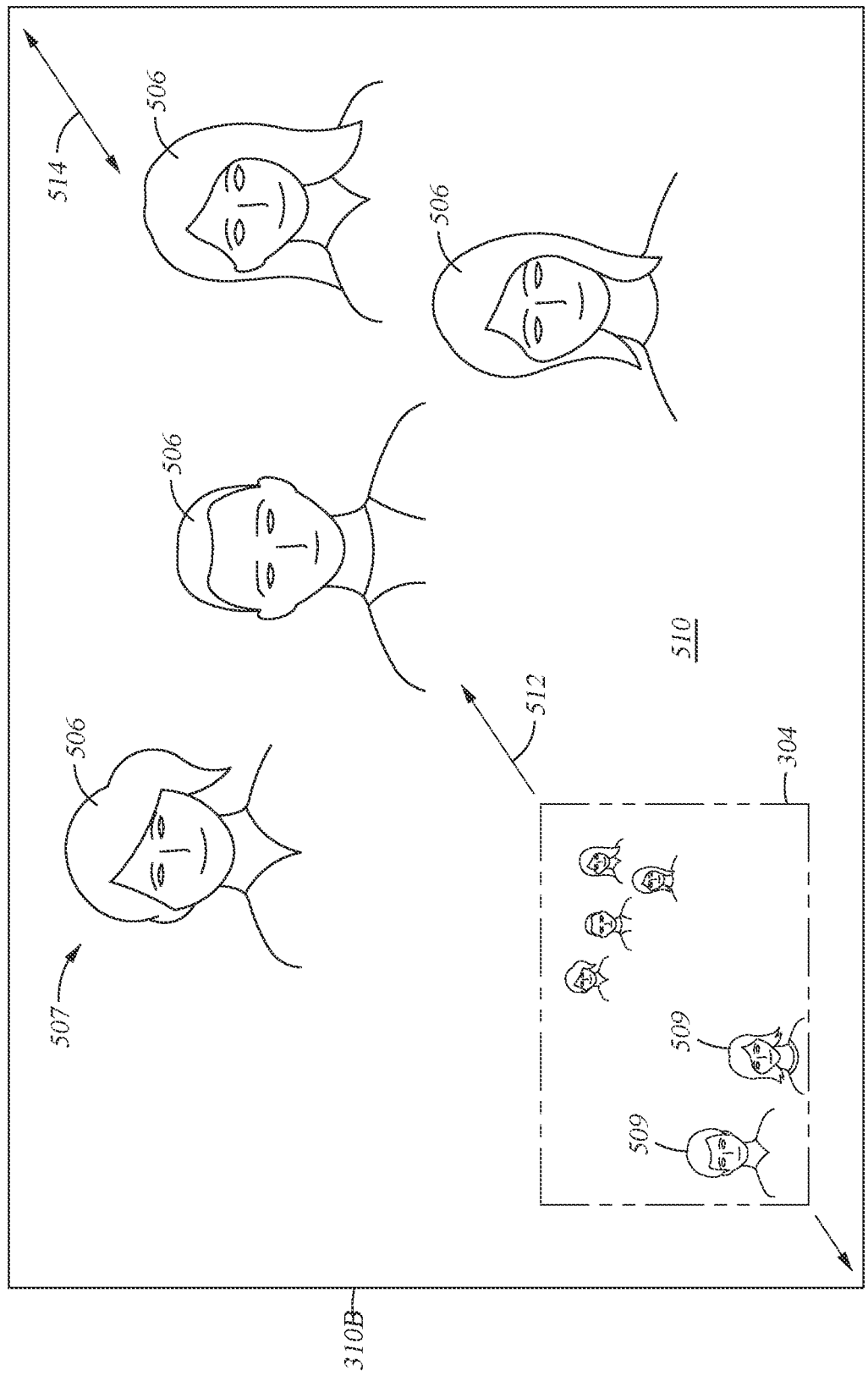

Aspects of activity 412 are illustrated in FIGS. 5B-5C. FIG. 5B shows a survey view 304 of a conference environment 502 having a plurality of conference participants 506. The survey view 304 was analyzed to determine and select a desired priority group, (priority group 507), and the remaining non-priority participants 509 were excluded from the priority group 507, e.g., by changing the status of each of the non-priority participants 509 to an "ignore" status.

At activity 412, the method 400 includes applying a bias to the conference view 510 (the field-of-view of the conference camera device 34) to indicate, for the benefit of a remote viewer, a spatial relationship between the desired priority group 507 and one or more out-of-frame non-priority participants 509.

Here, the bias is applied towards the non-priority participants 509 to provide an asymmetrical composition where the desired priority group 507 is positioned away from the out-of-frame non-priority participants 509 to increase the negative space therebetween. A negative space is the area surrounding a main subject, e.g., the priority group 507, which is left unoccupied. Negative space helps define the main focus (positive space) of the image or video and can be used to create a sense of motion or spatial awareness therein. For example, in portrait photography, subjects are often positioned to one side of the frame to face towards the negative space created by the resulting asymmetry. A viewer of the portrait may perceive that the subject is looking at a person or object on the opposite side of the negative space, which provides a sense of spatial awareness even though the perceived person or object is invisible to the viewer.

Figure 6:
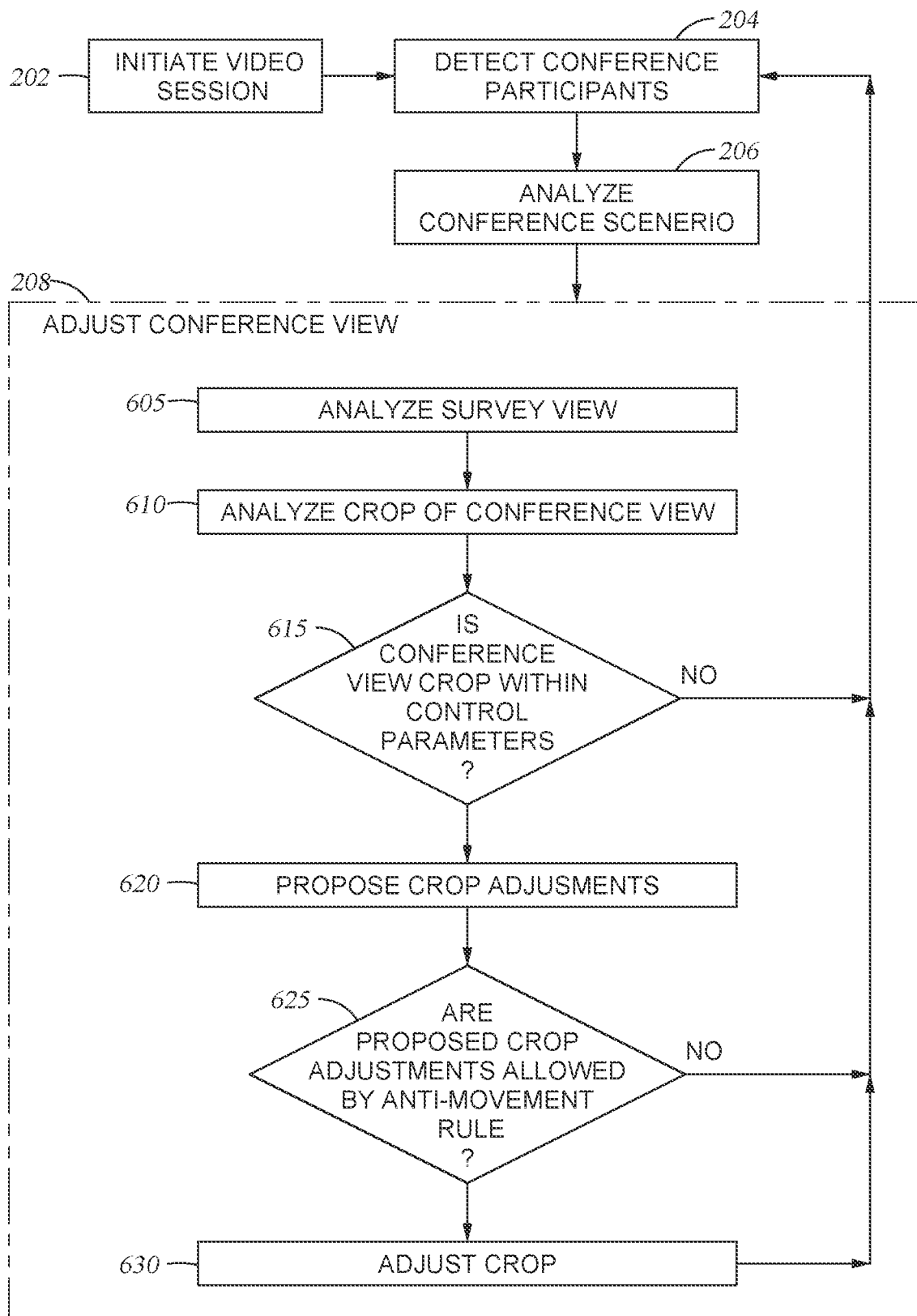
FIG. 6 is a flow diagram illustrating a crop adjust process, which may be used with the method of FIG. 2.

Typically, without bias, the priority group 507 is centered within the video stream according to one or more composition rules, such as described in FIG. 6. Biasing the conference view 510 towards the non-priority participants 509, as shown in FIG. 5C, provides a larger negative space (indicated by arrow 512) between the priority group 507 and the edge of the conference view 510 in the direction of the non-priority participants 509 creating the perception (correctly) that the non-priority participants are on the other side of the larger negative space. Similarly, biasing the conference view towards the non-priority participants 509 creates the smaller negative space (indicated by arrow 514) between the priority group 507 and an edge of the conference view 510 in the opposite direction of the bias, thus creating the perception (to a remote viewer) that there is nothing of interest (no other unseen participants on the opposite side of the smaller negative space). In some embodiments, the larger negative space 514 on one side of the priority group 507 is greater than the smaller negative space 512 on the other side of the priority group 507, such as at least 10% larger, at least 20% larger, at least 30% larger, at least 40% larger, or at least 50% larger, or even at least 100% larger. In some embodiments, the closest member of the priority group 507 to the edge of the conference view 510 in the bias direction is spaced apart from the edge of the conference view 510 in the bias direction by a first distance and the closest member to the edge of the conference view 510 in the opposite direction of the bias is spaced apart from the edge conference view in the direction opposite of the bias by a second distance, and the first distance is at least 10% greater than the second distance, such as at least 20% greater, at least 30% greater, at least 40% greater, or at least 50% greater, or even at least 100% greater.

In FIG. 5C, biasing the conference view 510 towards the out-of-frame non-priority participants 509 shifts the priority group 507 upward and to the right in a direction away from the out-of-frame non-priority participants 509. Beneficially, the increased negative space 512 between the priority group 507 and the lower left-hand portion of the frame provides a contextual cue to the relative locations of the priority group 507 and the out-of-frame non-priority participants 509 for the benefit of a remote conference participant.

In some embodiments, the method 400 further includes displaying the survey view 304 in the conference view 510 of the to-be-transmitted video stream. In some embodiments, as shown in FIG. 5C, the survey view 304 may be displayed in the negative space provided by the bias applied at activity 412. The survey view 304 may be displayed during the duration of the conference session, periodically throughout the conference session, or upon the occurrence of an event, such as a change in the conference view 510.

In other embodiments, activity 412 of the method 500 may be performed for a conference view 310B having one or more conference participants 306, e.g., one or more priority participants determined using any method. In those embodiments, the conference view 510 of the to-be-transmitted video stream may be biased towards one or more non-priority participants 509 using the crop bias process algorithm 112F as described above.

At activity 414, the method 400 includes adjusting the field-of-view using the crop assist process algorithm 112C, which is further described in FIG. 6 below.

FIG. 6 is a flow diagram of a method 600 for adjusting the composition of the conference video, based on the applicable conference scenario determined in the method 200. Here, adjustments to the composition of the conference video, e.g., using directional control and zoom features of the conference camera device 34, are controlled using software instructions, e.g., processes algorithm 112A-G, which are stored in memory 102 and executed by the processor 100. Aspects of the method 600 are described using the first conference scenario 300A schematically illustrated in FIG. 3A.

Figure 3A:
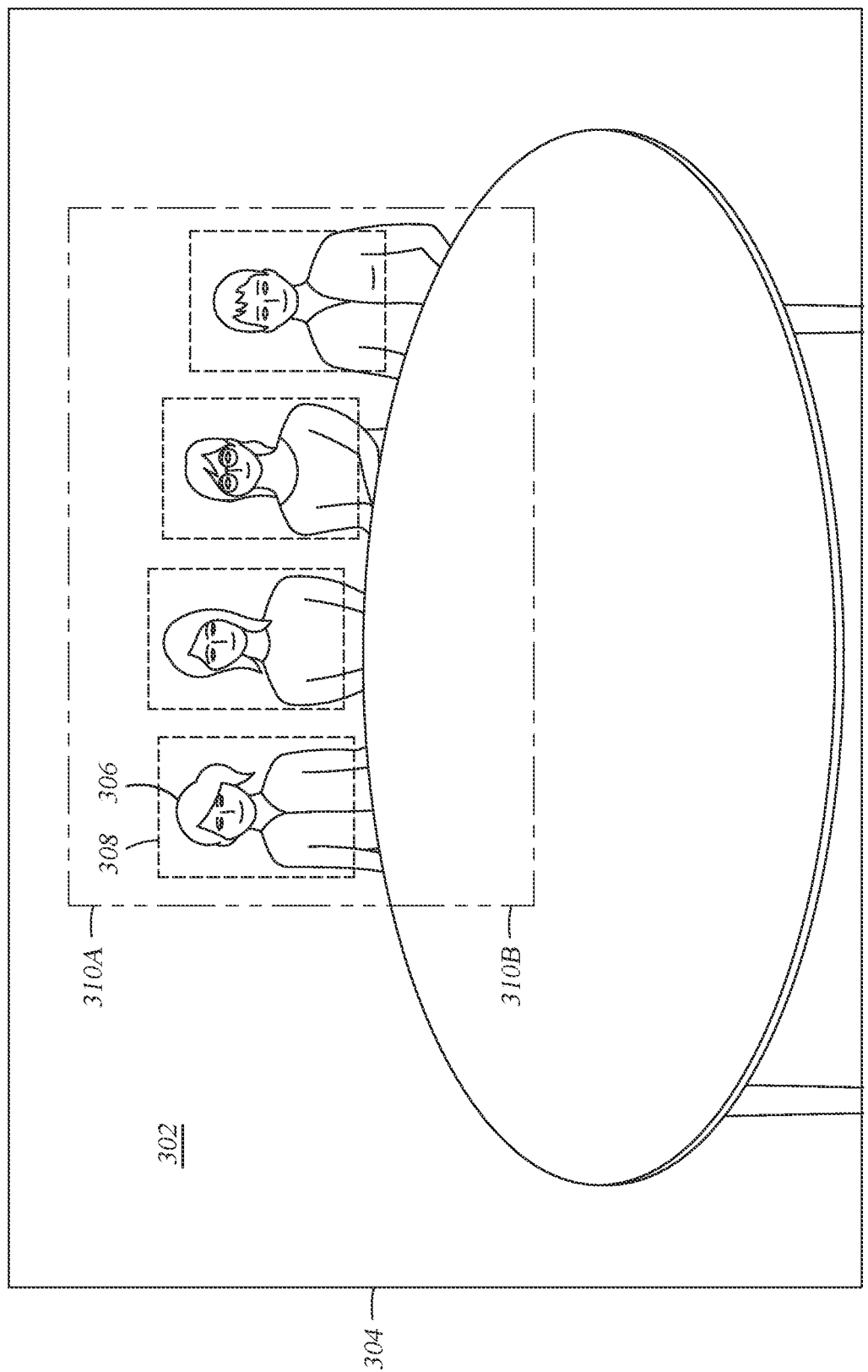
Figure 3C:
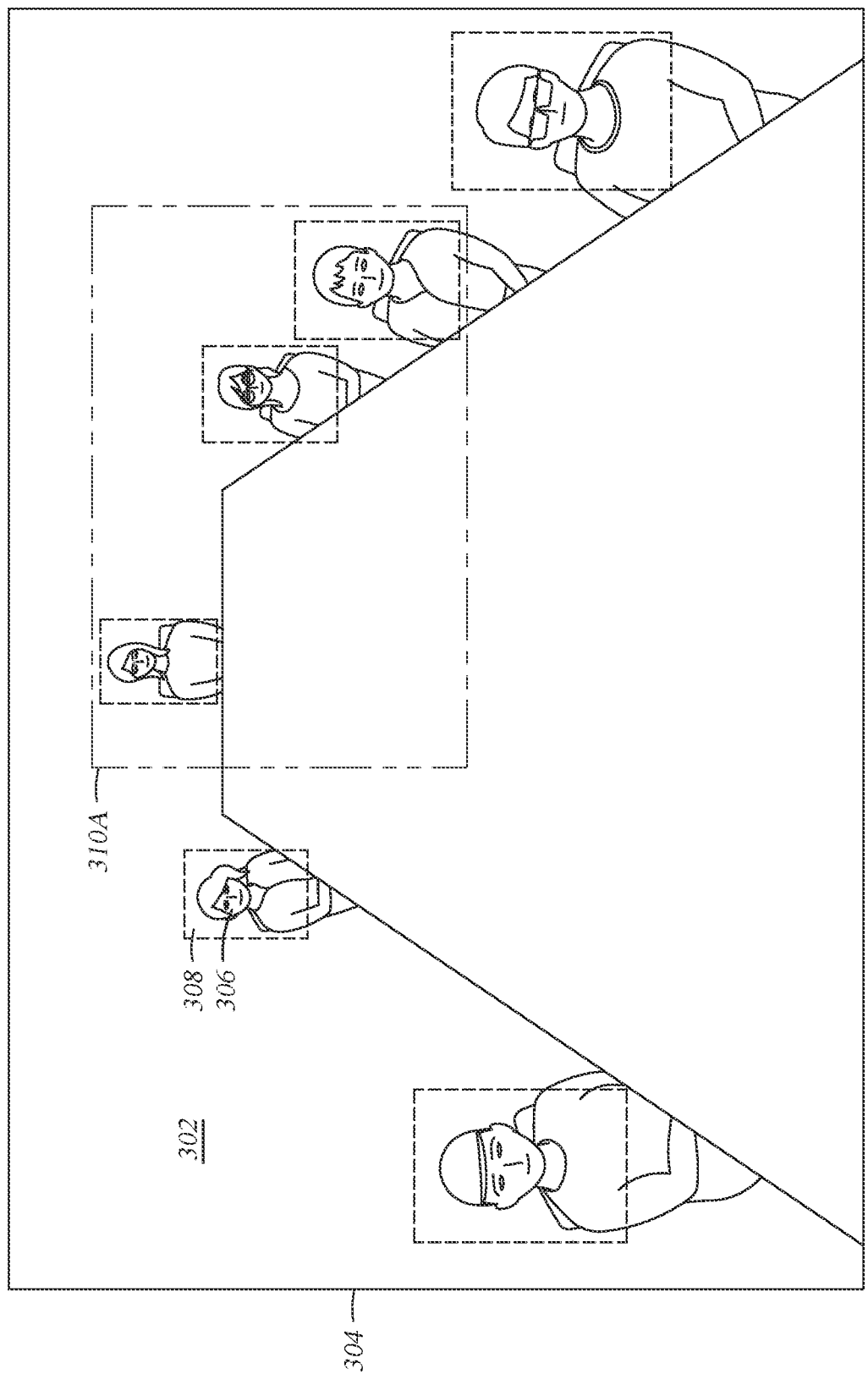

Herein, the method 600 is generally described with reference to the first conference scenario 300A (FIG. 3A). Modifications to the method 600 may be made when the applicable conference scenario is one of the remaining scenarios 300B-D. For example, when conference participants 306 have been grouped according to the grouping process described in FIG. 4 (third conference scenario 300C), non-priority participants 509 may be excluded from consideration when applying the crop-penalty scores and composition rules of the method 600. In those embodiments, the RIO 308 for each non-priority participant may be designated with an "ignore" status and activates of the method below, which reference conference participants 306 may be modified to include members of the priority group 507 and exclude ("ignore") non-priority members 509.

Modifications to the method 600 may also be made when the applicable conference scenario is recognized as less than ideal. For example, in the second conference scenario 300B it is recognized that at least a portion of a participant 306 will not fit within the cropped view of the conference view. In the fourth conference scenario 300D it is recognized that many of the participants in a crowd of participants, will not fit in the conference view. In both of those situations, it may be desirable to prevent the method 600 from triggering, e.g., by adjusting (broadening) the control limits used with the method 600.

Here, the method 600 begins at activity 204 by analyzing survey information (survey frames and/or survey data) to detect one or more conference participants 306 in the conference environment 302 and to determine the respective locations of the conference participants 306, as described above in FIG. 2. At activity 610 the method 600 includes determining the locations of each of the plurality of conference participants 306 relative to the boundaries of a conference view 310B to generate one or more crop-penalty scores.

Here, the conference view 310B corresponds to a field-of-view of the conference camera device 34. Each crop-penalty score indicates the undesirability of a boundary of the current conference view 310B relative to the location of the corresponding conference participant 306. In some embodiments, the locations of the conference participants and the distances between participants, and the boundaries of the conference view 310B are determined using a region-of-interest 308 defined around at least a portion of the conference participant 306.

Generally, a relatively high crop-penalty score indicates that the crop defining a boundary of the current conference view 310B relative to a conference participant is highly undesirable (e.g., a noticeable and/or significant portion of the participant is cropped) while a null crop-penalty score indicates that the crop defining the boundary of the relative to the conference participant is ideal (e.g., a small portion or no portion of the participant is cropped and the location of the participant within the conference view 310B has a desirable symmetry). In one example, a relatively high crop-penalty score may be assigned when an individual conference participant is located completely outside of a boundary of the current conference view 310B and a slightly lower score (but still relatively high) may be assigned if only a portion of the participant is located outside of the boundary. An even lower score may be assigned if the negative space defined about the conference participant 306 is undesirably asymmetric, but the participant is otherwise located inside of the boundary so that the crop, while not ideal, is not so annoying as to warrant changing the conference view 310B.

Typically, at least one crop-penalty score is generated for each identified conference participant. In some embodiments, crop-penalty scores for an individual conference participant are generated for each of the boundaries defining the current conference view 310B. For example, up to four crop-penalty scores may be generated for each individual conference participant each time a frame of the survey view 304 is analyzed at activity 204. Thus, if two conference participants are detected in a frame of the survey view 304 at activity 204, up to eight crop-penalty scores may be generated for that frame. If the number of conference participants remains the same, and a frame of the survey view 304 is generated every one second, then up to eighty crop-penalty scores may be generated in a 10 second time period. Here, the individual crop-penalty scores are stored in memory 102 of the system controller 38.

At activity 615 the method 600 includes comparing the crop-penalty score or an accumulation of the crop-penalty scores to a predetermined limit, which is stored in memory 102. The control limit may be a lower limit or an upper limit. In some embodiments, the crop-penalty score or the accumulation of crop-penalty scores may be compared to both lower and upper tolerance limits. Whether the control limit(s) is a lower limit, or an upper limit, or both may be based on the numerical values of crop-penalty scores assigned to corresponding framing events and/or the method used to determine the accumulated crop-penalty scores. For example, if the crop-penalty scores are positive integers and/or fractions, and the method used to determine an accumulated crop-penalty score is a summation of the positive integers and/or fractions, the control limit will likely be an upper limit. Thus, crop-penalty scores and accumulated crop-penalty scores that are greater than an upper control limit will be "outside of the upper limit."

Similarly, if the crop-penalty scores are negative integers and/or fractions and the method of determining the accumulated crop-penalty score is a summation, then the control limit will likely be a lower limit. Thus, crop-penalty scores and accumulated crop-penalty scores that are less than a lower crop-penalty tolerance limit are "outside of the lower limit." One should note that these examples are not intended to be limiting as it is recognized that any number or combination of schemes of assigning the crop-penalty scores and/or mathematically manipulating a plurality or crop-penalty scores to determine an accumulated crop-penalty score may be used with the methods set forth herein. In some embodiments, the control limit(s) may change based on the zoom level of the conference camera device 34 and/or based on the stability (shakiness) of the image provided in the video stream. In some embodiments, the control limit(s) may change based on the frequency of movement of conference participants within the scene. For example, the control limit(s) may be increased or widened when an increase in participant movement is detected, e.g., at the beginning or end of the meeting, thus delaying and/or preventing annoying camera adjustments while participants move about the room. Once participant movement is reduced, e.g., when participants are seated and the meeting begins, the control limit(s) may be decreased or narrowed, thus increasing the camera's responsiveness to relatively high-scoring framing events, such as a new participant entering the conference room late.

Here, one or more accumulated crop-penalty scores are generated using crop-assist data, which comprises individual crop-penalty scores and/or other information calculated therefrom. In some embodiments, the crop-assist data comprises individual crop-penalty scores acquired within a rolling time window where crop-penalty scores that are older than the time period defined by the rolling time window will decay or drop from the crop-assist data as new crop-penalty scores are acquired. In some embodiments, an accumulated crop-penalty score may comprise a sum of the individual crop-penalty scores acquired within the rolling time window or a rolling number of scores (e.g., the sum of the last three generated scores). In some embodiments, individual accumulated crop-penalty scores are separately generated for each of the boundaries defining a current conference view 310B. For example, for the rectangular conference view 310B, having four boundaries, a corresponding four accumulated crop-penalty scores may be generated.

Generally, if at least one of the one or more crop-penalty scores or accumulated crop-penalty scores are equal to or are outside of the control limit, then the method 600 will continue to activity 620. If none of the one or more accumulated crop-penalty scores are equal to or are outside of the control limit, the method 600 will return to activity 610 to identify the locations of one or more conference participants within a subsequently generated frame of the survey view 304. Beneficially, the accumulated crop-penalty scores generated in activity 615 prevent a software application executing on the system controller 38 from making unnecessary and/or frequent requests to adjust the conference view 310B. For example, a relatively high-scoring video-framing event such as a newly detected individual located outside of the conference view 310B may be fleeting if the newly detected individual quickly enters and leaves the conference environment 18. In this example, it would be undesirable to adjust the conference view 310B as the newly detected individual enters the conference room only to adjust it back a moment later when the newly detected individual leaves the conference room. Advantageous, the rolling accumulated crop-penalty scores described above may never reach the threshold value as the number of crop-penalty scores assigned to the newly detected individual would be limited by the number of frames analyzed during the short time period the individual was in the video conference environment.

At activity 620, the method 600 includes comparing a difference between the current conference view 310B and a desired conference view 310B. The desired conference view 310B may be determined using the one or more software algorithms 112 executing on the system controller 38 to define the boundaries of a desired conference view 3106 based on the locations of the conference participants identified at activity 204. In some embodiments, the difference between the current conference view 310B and the desired conference view 310B is analyzed using an anti-motion sickness software application, which may be stored in the memory 102 and executed by the processor 100. Typically, the anti-motion sickness software application is used to determine a difference between at least one attribute of the desired conference view 310B and at least one attribute of the current conference view 310B. The determined difference is then compared to the anti-movement rule.

At activity 625, the method 600 includes determining whether an alteration to the current conference view 310B should be allowed. The determination of whether to allow the alteration to the current conference view 310B is based on the comparison of the difference between the at least one attribute of the current conference view 3106 and the at least one attribute of the desired conference view 310B to the anti-movement rule. For example, in some embodiments, a software application that is being executed by the processor 100 applies the anti-movement rule to prevent adjustments that would be made to the conference view 310B that might cause a viewer of the video stream to experience unwanted physical effects. In one example, the application of the anti-movement rule will prevent changes to the video stream that would be perceived by a user as video flicker and/or a perceived swaying motion of portions of the field-of-view within the video stream, which would cause motion sickness.

Generally, in determining whether the video communication system 22 is allowed to change the current conference view 310B, the anti-motion sickness software application will apply the anti-movement rule to analyze the differences between various attributes of the current conference view 310B and the desired conference view 310B, such as the magnitude of the change in the field-of-view between the current conference view 310B and the desired conference view 310B (e.g., percentage change in viewing area, amount of pan, tilt or zoom adjustment, the symmetry of the one or more participants within the frame, etc.), the frequency of adjustments being made to the conference view 310B (e.g., related to amount of time since last change, number of changes within a period of time, etc.), and/or the effect the change will have on the composition of the current conference view 310B (e.g., change in number of conference participants, does the field-of-view include a person that is speaking, etc.), and the whether the composition of the current conference view 310B is generally satisfactory, even if it is not necessarily optimal.

In some embodiments, the anti-motion sickness software, applying the anti-movement rule, will analyze and compare the difference between the at least one attribute of the current conference view 3106 and the desired conference view 3106 to determine if the video communication system 22 is allowed to change the current conference view 310B. In some embodiments, the anti-movement rule includes one or more logical expressions, defined by software instructions stored in memory, that allow the anti-motion sickness software to determine that a change should be made to the conference view 310B based on an analysis of an attribute of the current conference view 3106 and the desired conference view 3106 and the anti-movement rule. In some embodiments, the anti-movement rule simply includes one or more anti-motion threshold values that are used to determine if a change should be made to the conference view 310B by comparing an anti-motion threshold value with a determined difference between an attribute of the current conference view 310B and the desired conference view 3106.

In one example of the processes performed in activity 625, if the frequency in time of the requested changes is too high (i.e., frequency that a crop-penalty score or the accumulated crop-penalty score has reached or exceeded the threshold value is too high), the anti-movement rule may be used to disallow or prevent the requested change from occurring. In another example, if the magnitude of the requested change is relatively low, the anti-movement rule may be used to disallow or prevent the requested change from occurring. In yet another example, if the magnitude of the change requires only a small adjustment in the amount of zoom perceived by the viewer and the composition of the current conference view 310B is generally satisfactory, e.g., if the upper bodies of the participants are within the boundaries of the current conference view 310B, the anti-movement rule may be used to reject the request to change the current conference view 310B. In some embodiments, the magnitude of the requested change may be measured by the degree of directional change required of the conference camera device 34 to provide the desired conference view 310B. For example, if the degree of pan requested is about 5 degrees or less, such as about 4 degrees or less, about 3 degrees or less, about 2 degrees or less, or about 1 degree or less, and the composition of the current conference view 310B of view is generally satisfactory, the anti-movement rule may be used to reject the requested change to the conference view 310B.

If the anti-movement rule allows the requested change to the current conference view 3106, the method 600 continues to activity 630. If the anti-movement rule rejects the requested change, the method 600 returns to activity 204 to identify the locations of one or more conference participants within the next analyzed frame of the survey view 304.

At activity 630, the anti-motion sickness software application, based on the requested desired conference view 3106 of view determined in the prior activities, then provides a control signal to the components within the conference camera device 34, which are used to adjust the conference view 310B. The control signal can include parameters that cause the conference camera device 34 to alter its pan, tilt and/or zoom in a manner that provides the desired conference view 3106 of the conference room environment without causing a user that is viewing the changing video stream to experience unwanted physical effects due to the camera adjustment. At activity 630 the method 600 includes altering the conference view 310B to correspond to the boundaries defined by the desired conference view 3106, thus providing a new current conference view 310B. Once the conference view 310B has been altered, the accumulated crop-penalty scores may be reset to a null value, and the method 600 returns to activity 205.

In some embodiments, the activities of method 600 may be serially repeated multiple times. In some embodiments, one or more of the activities of method 600 may be left out during the execution of the method 600. In one example, activities 204, 620, or 625, or 620 and 625 may be omitted from at least one pass of multiple repeated passes through the activities performed in method 600.

Beneficially, the method 600 may be used with any combination of the methods and the video communication system 22 described herein to improve the viewer experience by minimizing unnecessary, annoying, or frequent repositioning of the camera device as well as eliminating undesirable physical effects that may be associated therewith. In some embodiments, updates to the crop-penalty score generator and/or anti-movement rule are periodically delivered to the system controller 38 via device-ware updates to beneficially provide users with a continuously improving video conferencing experience over the lifetime of the video communication system 22.

While the foregoing is directed to embodiments of the present disclosure, other and further embodiments of the disclosure may be devised without departing from the basic scope thereof, and the scope thereof is determined by the claims that follow.

The invention claimed is:
1. A computer-implemented method, comprising:
   determining a plurality of subjects within a first view of a conference environment, wherein each of the plurality of subjects comprises a region-of-interest corresponding to a portion of an individual conference participant of a plurality of conference participants; and
   altering a second view of the conference environment after determining that at least a portion of one or more of the plurality of subjects cannot fit in the second view when the second view is adjusted to include the other ones of the plurality of subjects, wherein altering the second view comprises:
      analyzing the first view to determine one or more available subject groups, wherein each available subject group comprises two or more members selected from the plurality of subjects, and the second view can be adjusted to include all of the members within each available subject group;
      generating a subject priority rating for each individual conference participant of the plurality of conference participants;
      determining, using the subject priority ratings, a group priority rating for each available subject group; and
      determining a priority subject group, using the determined group priority ratings, the priority subject group comprising two or more subjects of the plurality of subjects; and
      adjusting the second view to include the priority subject group.
2. The method of claim 1, wherein:
   the first view is a field-of-view of a first camera device;
   the second view is a field-of-view of a second camera device; and
   the subject priority ratings are based on:
      a location of the conference participant within the conference environment,
      a location of the conference participant within the first view,
      a distance between the conference participant and one of the first or second camera devices,
      a speaking duration of the conference participant,
      a speaking frequency of the conference participant,
      relative distances between the conference participant and other conference participants, or
      a frequency and/or duration of conference participant's engagement with personal electronic devices.
3. The method of claim 1, wherein
   the first view is a field-of-view of a first camera device,
   the second view is a field-of-view of a second camera device,
   at least one of the subject priority ratings is based on a distance between the subject and the second camera device, and
   a first conference participant located further than about 1.5 meters from the camera device or closer than about 4 meters to the camera device will receive a higher priority rating than a second conference participant located closer than about 1.5 meters from the camera device or further than about 4 meters from the camera device.
4. A computer-implemented method, comprising:
   determining a plurality of subjects within a first view of a conference environment, wherein each of the plurality of subjects comprises a region-of-interest corresponding to a portion of an individual conference participant of a plurality of conference participants; and
   altering a second view of the conference environment after determining that at least a portion of one or more of the plurality of subjects cannot fit in the second view when the second view is adjusted to include the other ones of the plurality of subjects, wherein altering the second view comprises:
      determining a priority subject group, the priority subject group comprising two or more subjects of the plurality of subjects, wherein subjects that are not in the priority group are non-priority subjects;
      adjusting the second view to include the priority subject group; and
      biasing the second view towards one or more non-priority subjects to create a larger negative space between the priority group and at least one of the boundaries of the second view in a direction of the one or more non-priority subjects and a smaller negative space between the one or more priority participants and at least one of the boundaries of the second view in a direction away from the one or more non-priority subjects.
5. The method of claim 4, further comprising:
   before biasing the second view toward the one or more non-priority subjects, determining that the one or more non-priority subjects are not interposed between the priority subject group and an edge or corner of the first view.
6. The method of claim 4, further comprising:
   generating a video stream of the conference environment, the video stream comprising a combination of the second view and the first view, and the first view is interposed in the larger negative space created by biasing the second view in the direction of the one or more non-priority subjects.
7. A computer-implemented method, comprising:
   determining a plurality of subjects within a first view of a conference environment, wherein each of the plurality of subjects comprises a region-of-interest corre- sponding to a portion of an individual conference participant of a plurality of conference participants;

determining that a first portion of one of the plurality of subjects cannot fit in a second view of the conference environment and a second portion of the one subject can fit in the second view when the second view is adjusted to include the other ones of the plurality of subjects;

determining a priority subject group, the priority subject group comprising two or more subjects of the plurality of subjects; and altering the second view to include the priority subject group when a ratio of the first portion to the second portion is equal to or greater than a threshold value.

8. A computer-implemented method, comprising:

determining a plurality of subjects within a first view of a conference environment, wherein each of the plurality of subjects comprises a region-of-interest corresponding to a portion of an individual conference participant of a plurality of conference participants;

determining that a first portion of one of the plurality of subjects cannot fit in a second view of the conference environment and a second portion of the one subject can fit in the second view when the second view is adjusted to include the other ones of the plurality of subjects;

determining a priority subject group, the priority subject group comprising two or more subjects of the plurality of subjects; and altering the second view to include at least a portion of each of the plurality of subjects when a ratio of the first portion to the second portion is equal to or less than a threshold value.

9. A computer-implemented method, comprising:

determining a plurality of subjects within a first view of a conference environment, wherein each of the plurality of subjects comprises a region-of-interest corresponding to a portion of an individual conference participant of a plurality of conference participants;

altering a second view of the conference environment after determining that at least a portion of one or more of the plurality of subjects cannot fit in the second view when the second view is adjusted to include the other ones of the plurality of subjects, wherein altering the second view comprises:

analyzing the first view to determine one or more available subject groups, wherein each available subject group comprises two or more members selected from the plurality of subjects, and the second view can be adjusted to include all of the members within each available subject group;

generating a subject priority rating for each individual conference participant of the plurality of conference participants;

determining, using the subject priority ratings, a group priority rating for each available subject group;

determining a priority subject group, using the determined group priority ratings, the priority subject group comprising two or more subjects of the plurality of subjects; and adjusting the second view to include the priority subject group; and altering the second view after determining that each of the plurality of subjects can fit in the second view, comprising:

analyzing the second view to determine an actual composition thereof;

comparing the actual composition of the second view to one or more composition rules;

analyzing the first view, using the one or more composition rules, to determine a desired composition of the second view; and altering the second view based on a difference between the actual composition and the desired composition.

10. The method of claim 9, wherein the second view is altered after comparing the difference between the actual composition and the desired composition with an anti-movement rule and a determination is made, based on the comparison of the difference to the anti-movement rule, that the alteration to the second view should be made.

11. A computer-implemented method, comprising:

(a) identifying a plurality of subjects within a first view of a conferencing environment, wherein each of the plurality of subjects comprises a region-of-interest corresponding to a portion of an individual conference participant of a plurality of conference participants;

(b) determining one or more available subject groups, wherein each available subject group comprises two or more members selected from the plurality of subjects, and the two or more members can collectively fit in a second view;

(c) determining that at least a portion of at least one subject of the plurality subjects will not fit in the second view when the second view is adjusted to include a maximum number of the plurality of subjects;

(d) determining a priority subject group from the one or more available subject groups; and (e) adjusting the second view to include the priority subject group.

12. A computer-implemented method, comprising:

(a) identifying a plurality of subjects within a first view of a conferencing environment, wherein each of the plurality of subjects comprises a region-of-interest corresponding to a portion of an individual conference participant of a plurality of conference participants;

(b) determining one or more available subject groups, wherein each available subject group comprises two or more members selected from the plurality of subjects, and the two or more members can collectively fit in a second view;

(c) determining a priority subject group from the one or more available subject groups, comprising:

generating a subject priority rating for each conference participant of the plurality of conference participants;

determining, using the subject priority ratings, a group priority rating for each available subject group; and selecting the priority subject group based on the group priority ratings; and (d) adjusting the second view to include the priority subject group.

13. The method of claim 12, wherein the subject priority ratings are based on:

a location of the conference participant within the conference environment, a location of the conference participant within the first view, a distance between the conference participant and a camera device having the first or second view, a speaking duration of the conference participant, a speaking frequency of the conference participant, relative distances between the conference participant and other conference participants, or a frequency and/or duration of conference participant's engagement with personal electronic devices.

14. The method of claim 13, wherein at least one of the subject priority ratings is based on a distance between the subject and the camera device, wherein a first conference participant located further than about 1.5 meters from the camera device or closer than about 4 meters to the camera device will receive a higher priority rating than a second conference participant located closer than about 1.5 meters from the camera device or further than about 4 meters from the camera device.

15. A computer-implemented method, comprising:
   (a) identifying a plurality of subjects within a first view of a conferencing environment, wherein each of the plurality of subjects comprises a region-of-interest corresponding to a portion of an individual conference participant of a plurality of conference participants;
   (b) determining one or more available subject groups, wherein each available subject group comprises two or more members selected from the plurality of subjects, and the two or more members can collectively fit in a second view;
   (c) determining a priority subject group from the one or more available subject groups, wherein one or more of the plurality of subjects are not in the priority group, the subjects that are not in the priority group are non-priority subjects; and
   (d) adjusting the second view to include the priority subject group, comprising:
      determining that one or more non-priority subjects are not interposed between the priority subject group and an edge or corner of the first view; and
      biasing the second view towards the one or more non-priority subjects to create a larger negative space between the priority group and the boundaries of the second view in a direction of the one or more non-priority subjects and a smaller negative space between the one or more priority subjects and at least one of the boundaries of the second view in a direction away from the one or more non-priority subjects.

16. The method of claim 15, further comprising:
   generating a video stream of the conference environment, the video stream comprising a combination of the second view and the first view, and the first view is interposed in the larger negative space created by biasing the second view in the direction of the one or more non-priority subjects.

17. A video communication system, comprising:
   a first camera device to provide a first field-of-view, the first camera device having a first view angle of about 90° or more;
   a second camera device to provide a second field-of-view, the second camera device having directional and zoom control capability and a second view angle that is less than the first view angle; and
   a system controller that comprises a processor and an algorithm stored in memory, wherein the algorithm comprises a number of instructions which, when executed by the processor, causes the system controller to perform a method comprising:
   (a) identifying a plurality of subjects within a conferencing environment;
   (b) determining one or more available subject groups, wherein each available subject group comprises two or more members selected from the plurality of subjects, and the two or more members can collectively fit in a second the second field-of-view;
   (c) determining a priority subject group from the one or more available subject groups, wherein one or more of the plurality of subjects are not in the priority group, and the subjects that are not in the priority group are non-priority subjects; and
   (d) adjusting the second field-of-view to include the priority subject group by
      (i) determining that one or more non-priority subjects are not interposed between the priority subject group and an edge or corner of the first view; and
      (ii) biasing the second view towards the one or more non-priority subjects to create a larger negative space between the priority group and at least one boundary of the second view in the direction of the one or more non-priority subjects and a smaller negative space between the one or more priority participants and at least one of the boundaries of the second view in a direction away from the one or more non-priority subjects.

18. The video communication system of claim 17, wherein the method further comprises:
   generating a video stream of the conference environment, the video stream comprising a combination of the second view and the first view, and the first view is interposed in the larger negative space created by biasing the second view in the direction of the one or more non-priority subjects.

19. A computer-implemented method, comprising:
   determining a plurality of conference participants within a first view of a conference environment, the plurality of conference participants comprising one or more priority participants and one or more non-priority participants;
   altering a second view of the conference environment to include the one or more priority participants;
   biasing the second view towards the one or more non-priority participants to create a larger negative space between the one or more priority participants and at least one of the boundaries of the second view in a direction of the one or more non-priority participants and a smaller negative space between the one or more priority participants and at least one of the boundaries of the second view in a direction away from the one or more non-priority participants;
   generating a video stream of the second view; and
   transmitting the video stream of the second view to a remote video conferencing location.

20. The method of claim 19, further comprising:
   before biasing the second view toward the one or more non-priority participants, determining that the one or more non-priority participants are not interposed between the one or more priority participants and an edge or corner of the to-be-biased second view.

21. The method of claim 19, wherein generating the video stream further comprises interposing the first view in the larger negative space created by biasing the second view in the direction of the one or more non-priority participants.

* * * * *